US011120012B2

(12) United States Patent
Park et al.

(10) Patent No.: US 11,120,012 B2
(45) Date of Patent: Sep. 14, 2021

(54) WEB SERVICES PLATFORM WITH INTEGRATION AND INTERFACE OF SMART ENTITIES WITH ENTERPRISE APPLICATIONS

(71) Applicant: Johnson Controls Technology Company, Auburn Hills, MI (US)

(72) Inventors: Youngchoon Park, Brookfield, WI (US); Sudhi R. Sinha, Milwaukee, WI (US); Vaidhyanathan Venkiteswaran, Brookfield, WI (US); Erik S. Paulson, Madison, WI (US); Vijaya S. Chennupati, Brookfield, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 107 days.

(21) Appl. No.: 16/142,859

(22) Filed: Sep. 26, 2018

(65) Prior Publication Data

US 2019/0098113 A1 Mar. 28, 2019

Related U.S. Application Data

(60) Provisional application No. 62/564,247, filed on Sep. 27, 2017, provisional application No. 62/588,190, (Continued)

(51) Int. Cl.
*H04L 29/08* (2006.01)
*G06F 16/23* (2019.01)
(Continued)

(52) U.S. Cl.
CPC ...... *G06F 16/2379* (2019.01); *G06F 16/2228* (2019.01); *G06F 16/2358* (2019.01);
(Continued)

(58) Field of Classification Search
CPC .. G06F 16/2379; G06F 9/547; G06F 16/9024; G06F 16/288; G06F 16/2228;
(Continued)

(56) References Cited

U.S. PATENT DOCUMENTS 6,487,457 B1  11/2002  Hull et al.
6,493,755 B1  12/2002  Hansen et al.
(Continued)

FOREIGN PATENT DOCUMENTS

WO  WO-2009/020158 A1  2/2009
WO  WO-2011/100255 A2  8/2011
(Continued)

OTHER PUBLICATIONS

International Search Report and Written Opinion on PCT/US2017/052060, dated Oct. 5, 2017, 11 pages.
(Continued)

*Primary Examiner* — Kim T Nguyen
(74) *Attorney, Agent, or Firm* — Foley & Lardner LLP

(57) ABSTRACT

One or more non-transitory computer readable media contain program instructions that, when executed by one or more processors, cause the one or more processors to perform operations including: creating and managing a plurality of smart entities, each of the smart entities including a plurality of attributes; receiving inbound data from one or more enterprise applications; translating the inbound data into values for one or more of the plurality of attributes; writing the plurality of attributes to the smart entities; reading the plurality of attributes from the smart entities; translating the plurality of attributes into outbound data; and providing the outbound data to the one or more enterprise applications.

20 Claims, 12 Drawing Sheets

Related U.S. Application Data filed on Nov. 17, 2017, provisional application No. 62/588,179, filed on Nov. 17, 2017, provisional application No. 62/588,114, filed on Nov. 17, 2017, provisional application No. 62/611,962, filed on Dec. 29, 2017.

(51) Int. Cl.
*H04W 4/38* (2018.01)
*H04L 12/24* (2006.01)
*G06F 16/901* (2019.01)
*G06F 16/28* (2019.01)
*G06F 16/22* (2019.01)
*H04L 29/06* (2006.01)
*G06F 9/54* (2006.01)

(52) U.S. Cl.
CPC ........ *G06F 16/288* (2019.01); *G06F 16/9024* (2019.01); *H04L 41/024* (2013.01); *H04L 41/12* (2013.01); *H04L 67/02* (2013.01); *H04L 67/10* (2013.01); *H04L 67/32* (2013.01); *H04W 4/38* (2018.02); *G06F 9/547* (2013.01); *H04L 41/142* (2013.01); *H04L 69/08* (2013.01)

(58) Field of Classification Search
CPC .... G06F 16/2358; H04W 4/38; H04L 41/024; H04L 67/02; H04L 67/32; H04L 41/12; H04L 67/10; H04L 69/08; H04L 41/142
See application file for complete search history.

(56) References Cited

U.S. PATENT DOCUMENTS

| | | |
|---|---|---|
| 7,627,544 B2 | 12/2009 | Chkodrov et al. |
| 7,889,051 B1 | 2/2011 | Billig et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,788,097 B2 | 7/2014 | Drees et al. |
| 8,843,238 B2 | 9/2014 | Wenzel et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,354,968 B2 | 5/2016 | Wenzel et al. |
| 9,507,686 B2 | 11/2016 | Horn et al. |
| 9,558,196 B2 | 1/2017 | Johnston et al. |
| 9,753,455 B2 | 9/2017 | Drees |
| 10,055,206 B2 | 8/2018 | Park et al. |
| 2002/0016639 A1 | 2/2002 | Smith et al. |
| 2003/0073432 A1 | 4/2003 | Meade, II |
| 2003/0171851 A1 | 9/2003 | Brickfield et al. |
| 2003/0200059 A1 | 10/2003 | Ignatowski et al. |
| 2005/0283337 A1 | 12/2005 | Sayal |
| 2006/0140207 A1 | 6/2006 | Eschbach et al. |
| 2007/0261062 A1 | 11/2007 | Bansal et al. |
| 2008/0097816 A1 | 4/2008 | Freire et al. |
| 2008/0186160 A1 | 8/2008 | Kim et al. |
| 2010/0131533 A1 | 5/2010 | Ortiz |
| 2010/0281387 A1 | 11/2010 | Holland et al. |
| 2011/0047418 A1* | 2/2011 | Drees .................... G05B 23/00 714/57 |
| 2011/0153603 A1 | 6/2011 | Adiba et al. |
| 2011/0154363 A1* | 6/2011 | Karmarkar ........... G06Q 10/087 719/313 |
| 2011/0191343 A1 | 8/2011 | Heaton et al. |
| 2012/0062577 A1 | 3/2012 | Nixon |
| 2012/0136485 A1 | 5/2012 | Weber et al. |
| 2012/0259583 A1 | 10/2012 | Noboa et al. |
| 2012/0278051 A1 | 11/2012 | Jiang et al. |
| 2013/0038430 A1 | 2/2013 | Blower et al. |
| 2013/0246916 A1 | 9/2013 | Reimann et al. |
| 2014/0172184 A1 | 6/2014 | Schmidt et al. |
| 2014/0205155 A1 | 7/2014 | Chung et al. |
| 2014/0207282 A1 | 7/2014 | Angle et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2015/0042240 A1 | 2/2015 | Aggarwal et al. |
| 2015/0105917 A1 | 4/2015 | Sasaki et al. |
| 2015/0156031 A1 | 6/2015 | Fadell et al. |
| 2015/0178421 A1 | 6/2015 | Borrelli et al. |
| 2015/0241895 A1 | 8/2015 | Lu et al. |
| 2015/0316918 A1 | 11/2015 | Schleiss et al. |
| 2016/0033946 A1 | 2/2016 | Zhu et al. |
| 2016/0070736 A1 | 3/2016 | Swan et al. |
| 2016/0119434 A1 | 4/2016 | Dong et al. |
| 2016/0195856 A1 | 7/2016 | Spero |
| 2016/0239756 A1 | 8/2016 | Aggour et al. |
| 2016/0277374 A1 | 9/2016 | Reid et al. |
| 2016/0313752 A1 | 10/2016 | Przybylski |
| 2016/0357828 A1 | 12/2016 | Tobin et al. |
| 2016/0363336 A1 | 12/2016 | Roth et al. |
| 2016/0370258 A1 | 12/2016 | Perez |
| 2017/0006135 A1 | 1/2017 | Siebel |
| 2017/0011318 A1 | 1/2017 | Vigano et al. |
| 2017/0052536 A1 | 2/2017 | Warner et al. |
| 2017/0068409 A1* | 3/2017 | Nair ......................... G06F 8/10 |
| 2017/0070775 A1 | 3/2017 | Taxier et al. |
| 2017/0090437 A1 | 3/2017 | Veeramani et al. |
| 2017/0093700 A1 | 3/2017 | Gilley et al. |
| 2017/0103327 A1 | 4/2017 | Penilla et al. |
| 2017/0123389 A1 | 5/2017 | Baez et al. |
| 2017/0134415 A1 | 5/2017 | Muddu et al. |
| 2017/0212482 A1 | 7/2017 | Boettcher et al. |
| 2017/0220641 A1 | 8/2017 | Chi et al. |
| 2017/0277769 A1 | 9/2017 | Pasupathy et al. |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0329289 A1 | 11/2017 | Kohn et al. |
| 2018/0069932 A1 | 3/2018 | Tiwari et al. |
| 2018/0176241 A1 | 6/2018 | Manadhata et al. |
| 2019/0163152 A1 | 5/2019 | Worrall et al. |
| 2021/0042299 A1* | 2/2021 | Migliori ............... G06F 16/2264 |

FOREIGN PATENT DOCUMENTS

| | | |
|---|---|---|
| WO | WO-2015/106702 A1 | 7/2015 |
| WO | WO-2017/035536 A1 | 3/2017 |

OTHER PUBLICATIONS

International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
Li et al., Event Stream Processing with Out-of-Order Data Arrival, International Conferences on Distributed Computing Systems, 2007, 8 pages.
Balaji et al, "Brick: Towards a Unified Metadata Schema for Buildings," dated Nov. 16-17, 2016, 10 pages.
Balaji et al, Brick: Metadata schema for portable smart building applications, dated Sep. 25, 2017, 20 pages.
Balaji et al, Demo Abstract: Portable Queries Using the Brick Schema for Building Applications, dated Nov. 16-17, 2016, 2 pages.

(56) References Cited

OTHER PUBLICATIONS

Bhattacharya et al., Short Paper: Analyzing Metadata Schemas for Buildings—The Good, The Bad and The Ugly, ACM, Nov. 4-5, 2015, 4 pages.
Brick: Towards a Unified Metadata Schema for Buildings, dated Nov. 16, 2016, 46 pages.
Building Blocks for Smart Buildings, BrickSchema.org, Mar. 2019, 17 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, Memoori Webinar, 2019, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.
Koh et al., "Scrabble: Transferrable Semi-Automated Semantic Metadata Normalization using Intermediate Representation," Nov. 7-8, 2018, 10 pages.
Koh et al., Plaster: An Integration, Benchmark, and Development Framework for Metadata Normalization Methods, dated Nov. 7-8, 2018, 10 pages.
Koh et al., Who can Access What, and When?, dated Nov. 13-14, 2019, 4 pages.
Metadata Schema for buildings, 3 pages, Brickschema.org (Cannot confirm date.).
International Search Report and Written Opinion for PCT/US2018/052994 dated Jan. 7, 2019, 19 pages.
Wei Su et al., "Development and Implementation of Software Gateways of Fire Fighting Subsystem Running on EBI," Control, Automation and Systems Engineering, Jul. 2009. IITA International Conference on, IEEE, pp. 9-12.

* cited by examiner

Remote Initiated

Gateway Initiated

WEB SERVICES PLATFORM WITH INTEGRATION AND INTERFACE OF SMART ENTITIES WITH ENTERPRISE APPLICATIONS

CROSS-REFERENCE TO RELATED APPLICATIONS

This application claims the benefit of and priority to U.S. Provisional Patent Application No. 62/564,247 filed Sep. 27, 2017, U.S. Provisional Patent Application No. 62/588,179 filed Nov. 17, 2017, U.S. Provisional Patent Application No. 62/588,190 filed Nov. 17, 2017, U.S. Provisional Patent Application No. 62/588,114 filed Nov. 17, 2017, and U.S. Provisional Patent Application No. 62/611,962 filed Dec. 29, 2017. The entire disclosure of each of these patent applications is incorporated by reference herein.

BACKGROUND

The present disclosure relates generally to a web services platform and more particularly to a web services platform configured to ingest, process, and store data from a variety of different data sources.

Web services platforms typically rely on hardware gateway devices to collect and pre-process data before the data is provided to the web services platform. Different gateways use different data ingestion techniques and software that often do not communicate using the same protocols or data models. Accordingly, maintenance and integration cost can be high when multiple gateways must work together to collect and provide data to a web services platform. It would be desirable to provide a solution that overcomes these and other problems associated with traditional gateway devices.

SUMMARY

One implementation of the present disclosure is a web services platform including an entity service and a software defined gateway. The entity service is configured to create and manage a plurality of smart entities. Each of the smart entities includes a plurality of attributes. The software defined gateway is configured to receive inbound data from one or more enterprise applications, translate the inbound data into values for one or more of the plurality of attributes, and write the plurality of attributes to the smart entities. The software defined gateway is configured to read the plurality of attributes from the smart entities, translate the plurality of attributes into outbound data, and provide the outbound data to the one or more enterprise applications.

In some embodiments, the software defined gateway is configured to use a different communications protocol to communicate with each of the plurality of enterprise applications.

In some embodiments, the software defined gateway is configured to translate between a first communications protocol or format used by one or more of the enterprise applications and a second protocol or format used by the entity service.

In some embodiments, the plurality of enterprise applications include at least one of a workflow automation system, a customer relationship management system, a global information system, a device management system, a human resources system, an accounting system, a marketing system, or a building management system.

In some embodiments, the plurality of enterprise applications include a workflow automation system and the inbound data include a workflow request. In some embodiments, the entity service is configured to create a workflow request entity representing the workflow request and generate a plurality of attributes of the workflow request entity using information contained in the workflow request.

In some embodiments, the smart entities are virtual representations of a physical system or device, person or group of people, or space or group of spaces.

In some embodiments, the inbound data include information technology (IT) data that describe one or more static characteristics of a device, person, or space. In some embodiments, the entity service is configured to transform the one or more characteristics of the device, person, or space into the one or more static attributes of the smart entities.

In some embodiments, the inbound data describe the plurality of smart entities and relationships therebetween.

In some embodiments, the inbound data include operational technology (OT) data that describe one or more dynamic states or conditions of a device, person, or space. In some embodiments, the entity service is configured to transform the one or more dynamic states or conditions of the device, person, or space into the one or more dynamic attributes of the smart entities.

In some embodiments, the inbound data include event data received in real-time from a web-based service. In some embodiments, the web-based service includes a web-based advertising service, a website traffic monitoring service, a web-based sales service, or a web-based analytics service.

In some embodiments, the inbound data include data samples collected from internet of things (IoT) devices.

In some embodiments, the plurality of smart entities include one or more object entities representing a plurality of physical devices, one or more data entities representing data generated by the physical devices, and one or more relational objects indicating relationships interconnecting the object entities and the data entities.

In some embodiments, one or more of the smart entities includes a static attribute identifying a physical device represented by the smart entity and a dynamic attribute storing a most recent value of a dynamic variable associated with the physical device.

In some embodiments, the plurality of smart entities include an object entity representing a physical device and a data entity representing data generated by the physical device. The data entity may include a static attribute identifying the object entity and a dynamic attribute storing a most recent value of a dynamic variable associated with the physical device.

In some embodiments, the plurality of smart entities include an object entity representing a physical device, a data entity representing data generated by the physical device, and a relational object including a first attribute identifying the object entity and a second attribute identifying the data entity.

Another implementation of the present disclosure is a web services platform for managing data relating to a plurality of physical devices connected to one or more electronic communications networks. The web services platform includes one or more processors and one or more computer-readable storage media communicably coupled to the one or more processors having instructions stored thereon. When executed by the one or more processors, the instructions cause the one or more processors to create and manage a plurality of smart entities. Each of the smart entities includes a plurality of attributes. The instructions cause the one or more processors to receive inbound data from one or more enterprise applications, translate the inbound data into values for one or more of the plurality of attributes, write the plurality of attributes to the smart entities, read the plurality of attributes from the smart entities, translate the plurality of attributes into outbound data, and provide the outbound data to the one or more enterprise applications.

In some embodiments, the instructions cause the one or more processors to use a different communications protocol to communicate with each of the plurality of enterprise applications.

In some embodiments, the instructions cause the one or more processors to translate between a first communications protocol or format used by one or more of the enterprise applications and a second protocol or format used by the plurality of smart entities.

In some embodiments, the plurality of enterprise applications include at least one of a workflow automation system, a customer relationship management system, a global information system, a device management system, a human resources system, an accounting system, a marketing system, or a building management system.

In some embodiments, the plurality of enterprise applications include a workflow automation system and the inbound data comprise a workflow request. In some embodiments, the instructions cause the one or more processors to create a workflow request entity representing the workflow request and generate a plurality of attributes of the workflow request entity using information contained in the workflow request.

In some embodiments, the smart entities are virtual representations of a physical system or device, person or group of people, or space or group of spaces.

In some embodiments, the inbound data include information technology (IT) data that describe one or more static characteristics of a device, person, or space. In some embodiments, the instructions cause the one or more processors to transform the one or more characteristics of the device, person, or space into the one or more static attributes of the smart entities.

In some embodiments, the inbound data describe the plurality of smart entities and relationships therebetween.

In some embodiments, the inbound data include operational technology (OT) data that describe one or more dynamic states or conditions of a device, person, or space. In some embodiments, the instructions cause the one or more processors to transform the one or more dynamic states or conditions of the device, person, or space into the one or more dynamic attributes of the smart entities.

In some embodiments, the inbound data include event data received in real-time from a web-based service. In some embodiments, the web-based service includes a web-based advertising service, a website traffic monitoring service, a web-based sales service, or a web-based analytics service.

In some embodiments, the inbound data include data samples collected from internet of things (IoT) devices.

In some embodiments, the plurality of smart entities include one or more object entities representing a plurality of physical devices, one or more data entities representing data generated by the physical devices, and one or more relational objects indicating relationships interconnecting the object entities and the data entities.

In some embodiments, one or more of the smart entities includes a static attribute identifying a physical device represented by the smart entity and a dynamic attribute storing a most recent value of a dynamic variable associated with the physical device.

In some embodiments, the plurality of smart entities include an object entity representing a physical device and a data entity representing data generated by the physical device. The data entity may include a static attribute identifying the object entity and a dynamic attribute storing a most recent value of a dynamic variable associated with the physical device.

In some embodiments, the plurality of smart entities include an object entity representing a physical device, a data entity representing data generated by the physical device, and a relational object including a first attribute identifying the object entity and a second attribute identifying the data entity.

Another implementation of the present disclosure is a method for managing data relating to a plurality of physical devices connected to one or more electronic communications networks. The method includes creating and managing a plurality of smart entities. Each of the smart entities includes a plurality of attributes. The method includes receiving inbound data from one or more enterprise applications, translating the inbound data into values for one or more of the plurality of attributes, writing the plurality of attributes to the smart entities, reading the plurality of attributes from the smart entities, translating the plurality of attributes into outbound data, and providing the outbound data to the one or more enterprise applications.

In some embodiments, the method includes using a different communications protocol to communicate with each of the plurality of enterprise applications.

In some embodiments, the method includes translating between a first communications protocol or format used by one or more of the enterprise applications and a second protocol or format used by the plurality of smart entities.

In some embodiments, the plurality of enterprise applications include at least one of a workflow automation system, a customer relationship management system, a global information system, a device management system, a human resources system, an accounting system, a marketing system, or a building management system.

In some embodiments, the plurality of enterprise applications include a workflow automation system and the inbound data comprise a workflow request. In some embodiments, the method includes creating a workflow request entity representing the workflow request and generating a plurality of attributes of the workflow request entity using information contained in the workflow request.

In some embodiments, the smart entities are virtual representations of a physical system or device, person or group of people, or space or group of spaces.

In some embodiments, the inbound data include information technology (IT) data that describe one or more static characteristics of a device, person, or space. In some embodiments, the method includes transforming the one or more characteristics of the device, person, or space into the one or more static attributes of the smart entities.

In some embodiments, the inbound data describe the plurality of smart entities and relationships therebetween.

In some embodiments, the inbound data include operational technology (OT) data that describe one or more dynamic states or conditions of a device, person, or space. In some embodiments, the method includes transforming the one or more dynamic states or conditions of the device, person, or space into the one or more dynamic attributes of the smart entities.

In some embodiments, the inbound data include event data received in real-time from a web-based service. In some embodiments, the web-based service includes a web-based advertising service, a website traffic monitoring service, a web-based sales service, or a web-based analytics service.

In some embodiments, the inbound data include data samples collected from internet of things (IoT) devices.

In some embodiments, the plurality of smart entities include one or more object entities representing a plurality of physical devices, one or more data entities representing data generated by the physical devices, and one or more relational objects indicating relationships interconnecting the object entities and the data entities.

In some embodiments, one or more of the smart entities includes a static attribute identifying a physical device represented by the smart entity and a dynamic attribute storing a most recent value of a dynamic variable associated with the physical device.

In some embodiments, the plurality of smart entities include an object entity representing a physical device and a data entity representing data generated by the physical device. The data entity may include a static attribute identifying the object entity and a dynamic attribute storing a most recent value of a dynamic variable associated with the physical device.

In some embodiments, the plurality of smart entities include an object entity representing a physical device, a data entity representing data generated by the physical device, and a relational object including a first attribute identifying the object entity and a second attribute identifying the data entity.

Another implementation of the present disclosure is one or more non-transitory computer readable media containing program instructions. When executed by one or more processors, the instructions cause the one or more processors to perform operations including creating and managing a plurality of smart entities. Each of the smart entities includes a plurality of attributes. The operations include receiving inbound data from one or more enterprise applications, translating the inbound data into values for one or more of the plurality of attributes, writing the plurality of attributes to the smart entities, reading the plurality of attributes from the smart entities, translating the plurality of attributes into outbound data, and providing the outbound data to the one or more enterprise applications.

In some embodiments, the instructions cause the one or more processors to use a different communications protocol to communicate with each of the plurality of enterprise applications.

In some embodiments, the instructions cause the one or more processors to translate between a first communications protocol or format used by one or more of the enterprise applications and a second protocol or format used by the plurality of smart entities.

In some embodiments, the plurality of enterprise applications include at least one of a workflow automation system, a customer relationship management system, a global information system, a device management system, a human resources system, an accounting system, a marketing system, or a building management system.

In some embodiments, the plurality of enterprise applications include a workflow automation system and the inbound data comprise a workflow request. In some embodiments, the instructions cause the one or more processors to create a workflow request entity representing the workflow request and generate a plurality of attributes of the workflow request entity using information contained in the workflow request.

In some embodiments, the smart entities are virtual representations of a physical system or device, person or group of people, or space or group of spaces.

In some embodiments, the inbound data include information technology (IT) data that describe one or more static characteristics of a device, person, or space. In some embodiments, the instructions cause the one or more processors to transform the one or more characteristics of the device, person, or space into the one or more static attributes of the smart entities.

In some embodiments, the inbound data describe the plurality of smart entities and relationships therebetween.

In some embodiments, the inbound data include operational technology (OT) data that describe one or more dynamic states or conditions of a device, person, or space. In some embodiments, the instructions cause the one or more processors to transform the one or more dynamic states or conditions of the device, person, or space into the one or more dynamic attributes of the smart entities.

In some embodiments, the inbound data include event data received in real-time from a web-based service. In some embodiments, the web-based service includes a web-based advertising service, a website traffic monitoring service, a web-based sales service, or a web-based analytics service.

In some embodiments, the inbound data include data samples collected from internet of things (IoT) devices.

In some embodiments, the plurality of smart entities include one or more object entities representing a plurality of physical devices, one or more data entities representing data generated by the physical devices, and one or more relational objects indicating relationships interconnecting the object entities and the data entities.

In some embodiments, one or more of the smart entities includes a static attribute identifying a physical device represented by the smart entity and a dynamic attribute storing a most recent value of a dynamic variable associated with the physical device.

In some embodiments, the plurality of smart entities include an object entity representing a physical device and a data entity representing data generated by the physical device. The data entity may include a static attribute identifying the object entity and a dynamic attribute storing a most recent value of a dynamic variable associated with the physical device.

In some embodiments, the plurality of smart entities include an object entity representing a physical device, a data entity representing data generated by the physical device, and a relational object including a first attribute identifying the object entity and a second attribute identifying the data entity.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a web services platform and components thereof are shown, according to some embodiments. The web services platform includes a software defined gateway and several platform services (e.g., a timeseries service, an entity service, a security service, an analytics service, etc.). The software defined gateway is configured to translate between a protocol or format used by the platform services and a variety of other protocols or formats used by external systems or devices that communicate with the web services platform. This allows the web services platform to ingest and process inbound data from a variety of different data sources and provide data to a variety of different external systems or devices.

The entity service is configured to create and manage smart entities. The smart entities include attributes that describe a corresponding system, device, person, relationship, or other items represented by the smart entities. In some embodiments, the attributes include both static and dynamic attributes. The entity service can use information technology (IT) data received from external systems or devices to generate values for the static attributes of the smart entities. Similarly, the entity service can use operational technology (OT) data received from external systems or devices to generate values for the dynamic attributes of the smart entities. These and other features of the web services platform are described in greater detail below.

Web Services System

Figure 1:
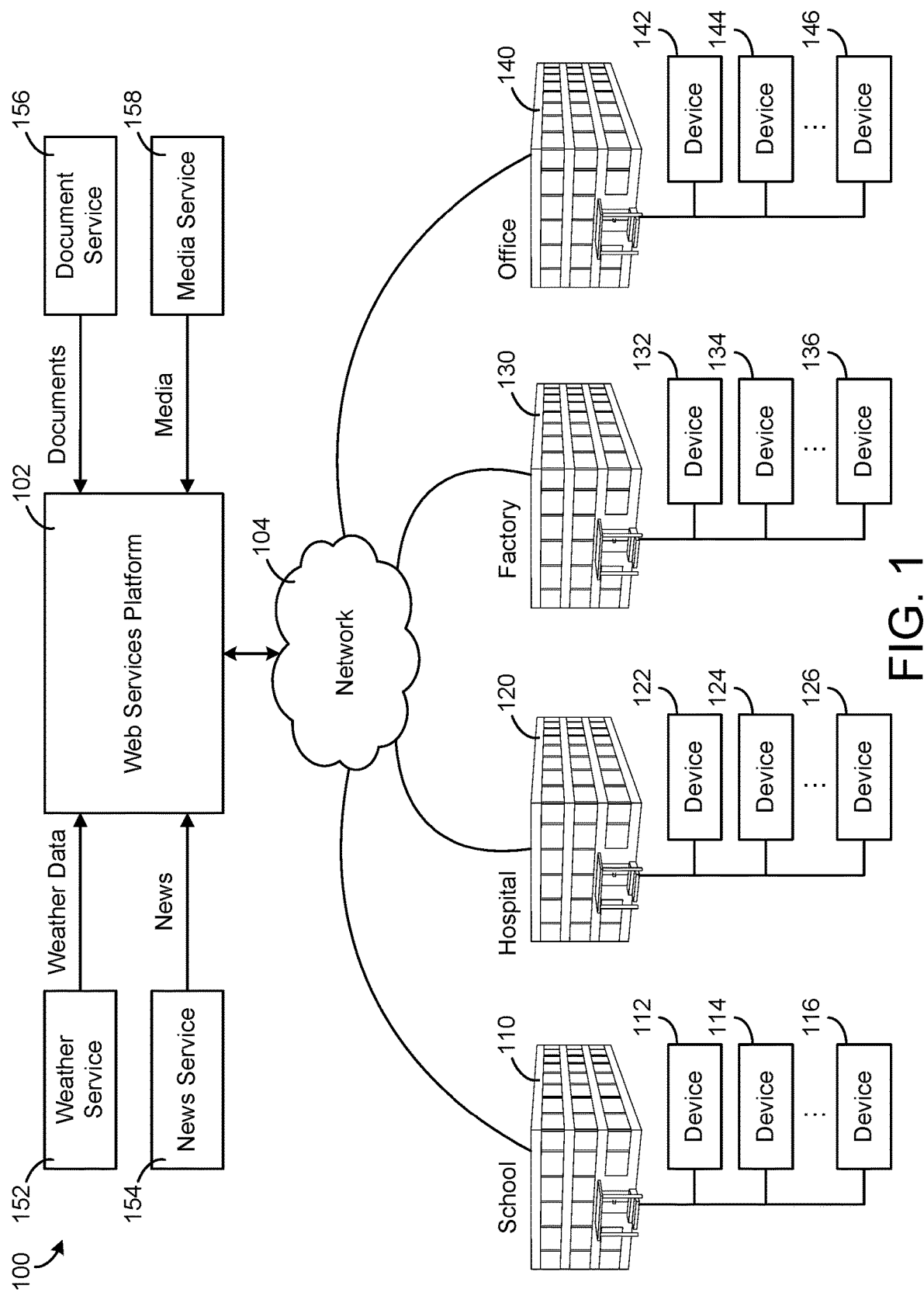
FIG. 1 is a block diagram of a web services system including a web services platform, according to some embodiments.

Referring now to FIG. 1, a block diagram of a web services system 100 is shown, according to an exemplary embodiment. Web services system 100 is shown to include a web services platform 102. Web services platform 102 can be configured to collect data from a variety of different data sources. For example, web services platform 102 is shown collecting data from a variety of devices 112-116, 122-126, 132-136, and 142-146. In some embodiments, devices 112-116, 122-126, 132-136, and 142-146 are internet of things (IoT) devices. Several examples of IoT devices which can provide data to web services platform 102 are described in detail with reference to FIG. 2. While the devices described herein are generally referred to as IoT devices, it should be understood that, in various embodiments, the devices references in the present disclosure could be any type of devices capable to communication of data over an electronic network.

Web services platform 102 can collect data from a variety of external systems or services. For example, web services platform 102 is shown receiving weather data from a weather service 152, news data from a news service 154, documents and other document-related data from a document service 156, and media (e.g., video, images, audio, social media, etc.) from a media service 158. In some embodiments, web services platform 102 generates data internally. For example, web services platform 102 may include a web advertising system, a website traffic monitoring system, a web sales system, or other types of platform services that generate data. The data generated by web services platform 102 can be collected, stored, and processed along with the data received from other data sources. Web services platform 102 can collect data directly from external systems or devices or via a network 104 (e.g., a WAN, the Internet, a cellular network, etc.). Web services platform 102 can process and transform collected data to generate timeseries data and entity data. Several features of web services platform 102 are described in detail below.

Web Services Platform

Figure 2:
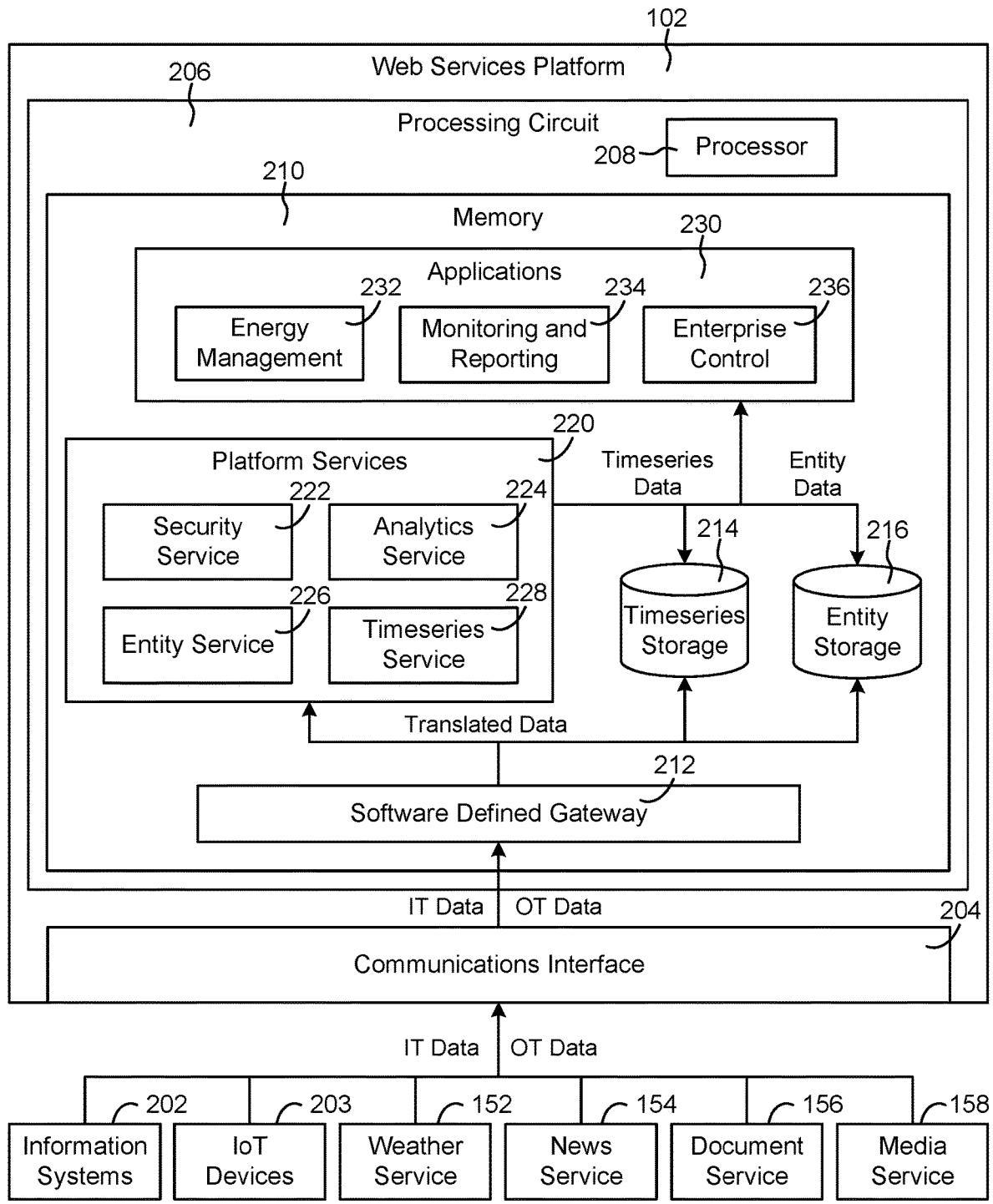
FIG. 2 is a block diagram illustrating the web services platform of FIG. 1 in greater detail including a software defined gateway, platform services, and application, according to some embodiments.

Referring now to FIG. 2, a block diagram illustrating web services platform 102 in greater detail is shown, according to some embodiments. Web services platform 102 can be configured to collect data from a variety of different data sources. For example, web services platform 102 is shown collecting data from information systems 202, internet of things (IoT) devices 203, weather service 152, news service 154, document service 156, and media service 158. In some embodiments, web services platform 102 separates data collection/ingestion; data storage, retrieval, and analysis; and data visualization into three different layers. This allows web services platform to support a variety of applications 230 that use the data and allows new applications 230 to reuse the existing infrastructure provided by platform services 220.

Information systems 202 can also include any type of system configured to manage information associated with any of a variety of devices, systems, people and/or the activities thereof. For example, information systems 202 can include a human resources (HR) system, an accounting system, a payroll system, a customer relationship management (CRM) system, a marketing system, an enterprise resource planning system, or any other type of system that can be used to manage devices, systems, people, and/or the information associated therewith.

IoT devices 203 may include any of a variety of physical devices, sensors, actuators, electronics, vehicles, home appliances, and/or other items having network connectivity which enable IoT devices 203 to communicate with web services platform 102. For example, IoT devices 203 can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. In some embodiments, IoT devices 203 include some or all of devices 112-116, 122-126, 132-136, and 142-146, as described with reference to FIG. 1.

Weather service 152, news service 154, document service 156, and media service 158 may be the same as previously described. For example, weather service 152 can be configured to provide weather data to web services platform 102. News service 154 can be configured to provide news data to web services platform 102. Document service 156 can be configured to provide documents and other document-related data to web services platform 102. Media service 158 can be configured to provide media (e.g., video, images, audio, social media, etc.) to web services platform 102. In some embodiments, media service 158 includes an internet-based advertising system or click tracking system. For example, media service 158 can provide event data to web services platform 102 in response to a web server delivering a webpage, advertisement, or receiving a click from a user. Web services platform 102 can be configured to ingest, process, store, and/or publish data from these and any of a variety of other data sources.

Web services platform 102 is shown receiving two main types of data: information technology (IT) data and operational technology (OT) data. IT data may include data that describes various entities (e.g., people, spaces, devices, etc.) and the relationships therebetween. For example, IT data may include an entity graph that describes the relationships between spaces, equipment, and other entities (e.g., person A owns device B, device B controls device C, sensor D provides input to device C, person E is part of employee team F, floor G contains room C, etc.). IT data may include human resources data that describes a set of employees and includes details about the employees (e.g., name, employee ID, job title/role, responsibilities, payroll information, address, etc.). IT data may include IoT device information (e.g., device locations, descriptions, device relationships, etc.), and/or other information that provides context for the data received by web services platform 102 or describes the entities managed by web services platform 102. In some embodiments, IT data is preexisting/static and can be provided to web services platform 102 as a batch. However, it is contemplated that IT data can be updated after it has been created if changes occur to the entities or relationships described by the IT data.

As used herein, the term "static" refers to data, characteristics, attributes, or other information that does not change over time or change infrequently. For example, a device name or address may be referred to as a static characteristic of the device because it does not change frequently. However, should be understood that "static" items are not limited to permanently fixed information. Some types of static items may change occasionally or infrequently. For example, a device address may be a type of static attribute that can be changed if desired but is not expected to change frequently. Static data is contrasted with dynamic data that is expected to change relatively frequently.

OT data may include data that is generated and/or updated in real-time as a result of operating the systems and devices that provide data to web services platform 102. For example, OT data may include timeseries data received from IoT devices 203 (e.g., sensor measurements, status indications, alerts, notifications, etc.), weather information received from weather service 152, a news feed received from news service 154, document updates received from document service 156, media updates received from media service 158, and/or other types of telemetry data. In general, OT data can be described as real-time operational data, dynamic data, or streaming data, whereas IT data can be described as institutional or contextual data that is not continuously updated. For example, the OT data associated with a particular sensor may include measurements from the sensor, whereas the IT data associated with the sensor may include the sensor name, sensor type, and sensor location.

Web services platform 102 can process and transform/translate the OT data and IT data using platform services 220 to generate timeseries data and entity data. Throughout this disclosure, the term "raw timeseries data" is used to describe the raw data samples of OT data received by web services platform 102. The term "derived timeseries data" is used to describe the result or output of a transformation or other timeseries processing operation performed by platform services 220 (e.g., data aggregation, data cleansing, virtual point calculation, etc.). The raw timeseries data and derived timeseries data can be provided to various applications 230 and/or stored in timeseries storage 214 (e.g., as materialized views of the raw timeseries data). The term "entity data" is used to describe the attributes of various entities (e.g., people, spaces, things, etc.) and relationships between entities. The entity data can be created by platform services 220 as a result of processing the IT data and/or OT data received by web services platform 102 and can be stored in entity storage 216.

Before discussing web services platform 102 in greater detail, it should be noted that the components of web services platform 102 can be integrated within a single device (e.g., a web server, a supervisory controller, a computing system, etc.) or distributed across multiple separate systems or devices. For example, the components of web services platform 102 can be implemented as part of a cloud computing platform configured to receive and process data from multiple IoT devices and other data sources. In other embodiments, the components of web services platform 102 can be implemented as part of a suite of cloud-hosted services. In other embodiments, some or all of the components of web services platform 102 can be components of a subsystem level controller, a plant controller, a device controller, a field controller, a computer workstation, a client device, or any other system or device that receives and processes data from IoT devices or other data sources.

Still referring to FIG. 2, web services platform 102 is shown to include a communications interface 204. Communications interface 204 can include wired or wireless communications interfaces (e.g., jacks, antennas, transmitters, receivers, transceivers, wire terminals, etc.) for conducting data communications with information systems 202, IoT devices 203, weather service 152, news service 154, document service 156, media service 158, or other external systems or devices. Communications conducted via communications interface 204 can be direct (e.g., local wired or wireless communications) or via a communications network 104 (e.g., a WAN, the Internet, a cellular network, etc.).

Communications interface 204 can facilitate communications between web services platform 102 and external applications (e.g., remote systems and applications) for allowing user control, monitoring, and adjustment to web services platform 102 and/or the devices that communicate with web services platform 102. Communications interface 204 can also facilitate communications between web services platform 102 and client devices (e.g., computer workstations, laptop computers, tablets, mobile devices, etc.). Web services platform 102 can be configured to communicate with external systems and devices using any of a variety of communications protocols (e.g., HTTP(S), WebSocket, CoAP, MQTT, etc.), industrial control protocols (e.g., MTConnect, OPC, OPC-UA, etc.), process automation protocols (e.g., HART, Profibus, etc.), home automation protocols, or any of a variety of other protocols. Advantageously, web services platform 102 can receive, ingest, and process data from any type of system or device regardless of the communications protocol used by the system or device.

Web services platform 102 is shown to include a processing circuit 206 including a processor 208 and memory 210. Processor 208 can be a general purpose or specific purpose processor, an application specific integrated circuit (ASIC), one or more field programmable gate arrays (FPGAs), a group of processing components, or other suitable processing components. Processor 208 is configured to execute computer code or instructions stored in memory 210 or received from other computer readable media (e.g., CDROM, network storage, a remote server, etc.).

Memory 210 can include one or more devices (e.g., memory units, memory devices, storage devices, etc.) for storing data and/or computer code for completing and/or facilitating the various processes described in the present disclosure. Memory 210 can include random access memory (RAM), read-only memory (ROM), hard drive storage, temporary storage, non-volatile memory, flash memory, optical memory, or any other suitable memory for storing software objects and/or computer instructions. Memory 210 can include database components, object code components, script components, or any other type of information structure for supporting the various activities and information structures described in the present disclosure. Memory 210 can be communicably connected to processor 208 via processing circuit 206 and can include computer code for executing (e.g., by processor 208) one or more processes described herein. When processor 208 executes instructions stored in memory 210, processor 208 generally configures processing circuit 206 to complete such activities.

In some embodiments, web services platform 102 includes a plurality of processors, memories, interfaces, and other components distributed across multiple devices or systems. For example, in a cloud-based or distributed implementation, web services platform 102 may include multiple discrete computing devices, each of which includes a processor 208, memory 210, communications interface 204, software defined gateway 212, and/or other components of web services platform 102. Tasks performed by web services platform 102 can be distributed across multiple systems or devices, which may be located within the building or facility or distributed across multiple buildings or facilities. In some embodiments, multiple software defined gateways 212 are implemented using different processors, computing devices, servers, and/or other components and carry out portions of the features described herein.

Still referring to FIG. 2, web services platform 102 is shown to include a software defined gateway 212. Software defined gateway 212 can receive the IT data and OT data via communications interface 204 and can provide translated IT data and OT data to platform services 220, timeseries storage 214, and/or entity storage 216. For example, software defined gateway 212 can be configured to translate the incoming IT data and OT data from a protocol or format used by the data sources into a protocol or format used by platform services 220. In some embodiments, the OT data include timestamps and data values for various data points. The data values can be measured or calculated values, depending on the type of data point. For example, a data point received from a temperature sensor can include a measured data value indicating a temperature measured by the temperature sensor. A data point received from a device controller can include a calculated data value indicating a calculated efficiency of the device. Software defined gateway 212 can receive data samples from multiple different devices.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, pressure sensor, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to web services platform 102. For example, data samples received via a first protocol can include a variety of descriptive attributes along with the data value, whereas data samples received via the second protocol may include a lesser number of attributes (e.g., only the data value without any corresponding attributes).

In some embodiments, each data sample is received with a timestamp indicating a time at which the corresponding data value was measured or calculated. In other embodiments, software defined gateway 212 adds timestamps to the data samples based on the times at which the data samples are received. Software defined gateway 212 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by software defined gateway 212 is as follows:
[<key, timestamp$_1$, value$_1$>, <key, timestamp$_2$, value$_2$>, <key, timestamp$_3$, value$_3$>]
where key is an identifier of the source of the raw data samples (e.g., timeseries ID, sensor ID, etc.), timestamp$_i$ identifies the time at which the ith sample was collected, and value$_i$ indicates the value of the ith sample.

Software defined gateway 212 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, software defined gateway 212 organizes the raw timeseries data. Software defined gateway 212 can identify a system or device associated with each of the data points. For example, software defined gateway 212 can associate a data point with an IoT device, a sensor, a networking device, or any other type of system or device. In various embodiments, software defined gateway 212 uses the name of the data point, a range of values of the data point, statistical characteristics of the data point, or other attributes of the data point to identify a particular system or device associated with the data point. Software defined gateway 212 can then determine how that system or device relates to the other systems or devices. For example, software defined gateway 212 can determine that the identified system or device is part of a larger system (e.g., a vehicle control system) or is associated with a particular space (e.g., a particular factory, a room or zone of the factory, etc.). In some embodiments, software defined gateway 212 uses or creates an entity graph when organizing the timeseries data. An example of such an entity graph is described in greater detail with reference to FIGS. 12 and 14.

In some embodiments, software defined gateway 212 uses the IT data and OT data to update the attributes of various entities. As described above, an entity is a virtual representation (e.g., a data object) of a person, space, system, device, or thing that provides data to web services platform 102. For example, a vehicle entity may be a virtual representation of a physical vehicle (e.g., a car, truck, airplane, boat, etc.). The vehicle entity may include a variety of attributes that describe the vehicle. For example, the vehicle may include a "location" attribute that describes where the vehicle is located, a "contains" attribute that identifies one or more systems or devices of equipment contained within the vehicle, a "temperature" attribute that indicates the current air temperature within the vehicle, an "occupancy" attribute that indicates whether the vehicle is occupied or unoccupied, or any of a variety of other attributes. Software defined gateway 212 can use the OT data to update the values of the attributes of various entities each time a new data sample or event is received. Similarly, software defined gateway 212 can use the IT data to update the values of the attributes of various entities when the relationships between entities or other attributes indicated by the IT data changes. In other embodiments, entity attributes are updated by entity service 226 of platform services 220.

Software defined gateway 212 can provide the timeseries data and entity data to platform services 220 and/or store the timeseries data and entity data in timeseries storage 214 and entity storage 216, respectively. In some embodiments, timeseries storage 214 and entity storage 216 can be data storage internal to web services platform 102 (e.g., within memory 210) or other on-site data storage local to the location at which the IT data and OT data are collected. In other embodiments, timeseries storage 214 and entity storage 216 can include a remote database, cloud-based data hosting, or other remote data storage. For example, timeseries storage 214 and entity storage 216 can include remote data storage located off-site relative to the location at which the IT data and OT data are collected. Timeseries storage 214 can be configured to store the raw timeseries data obtained by software defined gateway 212, the derived timeseries data generated by platform services 220, and/or directed acyclic graphs (DAGs) used by platform services 220 to process the timeseries data. Similarly, entity storage 216 can be configured to store the IT data and OT data collected by software defined gateway 212 and/or the entity data generated by platform services 220.

Still referring to FIG. 2, BMS 200 is shown to include platform services 220. Platform services 220 can receive the translated IT data and OT data from software defined gateway 212 and/or retrieve the timeseries data and entity data from timeseries storage 214 and entity storage 216. Platform services 220 can include a variety of services configured to analyze, process, and transform the IT data and OT data to create timeseries data and entity data. For example, platform services 220 are shown to include a security service 222, an analytics service 224, an entity service 226, and a timeseries service 228. Security service 222 can assign security attributes to the IT data and OT data to ensure that the IT data and OT data are only accessible to authorized individuals, systems, or applications.

Analytics service 224 can use the translated IT data and OT data as inputs to various analytics (e.g., fault detection, energy consumption, web traffic, revenue, etc.) to derive an analytic result from the IT data and OT data. Analytics service 224 can apply a set of fault detection rules to the IT data and OT data to determine whether a fault is detected at each interval of a timeseries. Fault detections can be stored as derived timeseries data. For example, analytics service 224 can generate a new fault detection timeseries with data values that indicate whether a fault was detected at each interval of the timeseries. The fault detection timeseries can be stored as derived timeseries data along with the raw timeseries data in timeseries storage 214.

Entity service 226 can use the translated IT data and OT data provided by software defined gateway 212 to create or update the attributes of various entities managed by web services platform 102. Some entity attributes may be the most recent value of a data point provided to web services platform 102 as OT data. For example, the "temperature" attribute of a vehicle entity may be the most recent value of a temperature data point provided by a temperature sensor located in the vehicle. Entity service 226 can use the IT data to identify the temperature sensor located in the vehicle and can use the OT data associated with the identified temperature sensor to update the "temperature" attribute each time a new sample of the temperature data point is received. As another example, a "most recent view" attribute of a webpage entity may indicate the most recent time at which the webpage was viewed. Entity service 226 can use the OT data from a click tracking system or web server to determine when the most recent view occurred and can update the "most recent view" attribute accordingly.

Other entity attributes may be the result of an analytic, transformation, calculation, or other processing operation based on the OT data and IT data. For example, entity service 226 can use the IT data to identify an access control device (e.g., an electronic lock, a keypad, etc.) at the entrance/exit of a vehicle. Entity service 226 can use OT data received from the identified access control device to track the number of occupants entering and exiting the vehicle. Entity service 226 can update a "number of occupants" attribute of an entity representing the vehicle each time a person enters or exits the vehicle such that the "number of occupants" attribute reflects the current number of occupants within the vehicle. As another example, a "total revenue" attribute associated with a product line entity may be the summation of all the revenue generated from sales of the corresponding product. Entity service 226 can use the OT data received from a sales tracking system (e.g., a point of sale system, an accounting database, etc.) to determine when a sale of the product occurs and identify the amount of revenue generated by the sale. Entity service 226 can then update the "total revenue" attribute by adding the most recent sales revenue to the previous value of the attribute.

In some embodiments, entity service 226 uses IT data and/or OT data from multiple different data sources to update the attributes of various entities. For example, an entity representing a person may include a "risk" attribute that quantifies the person's level of risk attributable to various physical, environmental, or other conditions. Entity service 226 can use OT data from a card reader or IT data from a human resources system to determine the physical location of the person at any given time. Entity service 226 can use weather data from weather service 152 to determine whether any severe weather is approaching the person's location. Similarly, entity service 226 can use emergency data from news service 154 or media service 158 to determine whether the person's location is experiencing any emergency conditions (e.g., active shooter, police response, fire response, etc.). Entity service 226 can use data from information systems 202 to determine whether the person's location is experiencing any emergency conditions (e.g., fire, building lockdown, etc.) or environmental hazards (e.g., detected air contaminants, pollutants, extreme temperatures, etc.) that could increase the person's level of risk. Entity service 226 can use these and other types of data as inputs to a risk function that calculates the value of the person's "risk" attribute and can update the person entity accordingly.

Still referring to FIG. 2, timeseries service 228 can apply various transformations, operations, or other functions to the raw timeseries data provided by software defined gateway 212 to generate derived timeseries data. In some embodiments, timeseries service 228 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 228 provide an efficient mechanism for applications 230 to query the timeseries data. For example, applications 230 can construct visualizations of the timeseries data (e.g., charts, graphs, etc.) using the pre-aggregated data rollups instead of the raw timeseries data. This allows applications 230 to simply retrieve and present the pre-aggregated data rollups without requiring applications 230 to perform an aggregation in response to the query. Since the data rollups are pre-aggregated, applications 230 can present the data rollups quickly and efficiently without requiring additional processing at query time to generate aggregated timeseries values.

In some embodiments, timeseries service 228 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 228 can calculate a virtual data point ($pointID_3$) by adding two or more actual data points ($pointID_1$ and $pointID_2$) (e.g., $pointID_3 = pointID_1 + pointID_2$). As another example, timeseries service 228 can calculate an enthalpy data point ($pointID_4$) based on a measured temperature data point ($pointID_2$) and a measured pressure data point ($pointID_6$) (e.g., $pointID_4 = \text{enthalpy}(pointID_2, pointID_6)$). The virtual data points can be stored as derived timeseries data.

Applications 230 can access and use the virtual data points in the same manner as the actual data points. Applications 230 do not need to know whether a data point is an actual data point or a virtual data point since both types of data points can be stored as derived timeseries data and can be handled in the same manner by applications 230. In some embodiments, the derived timeseries are stored with attributes designating each data point as either a virtual data point or an actual data point. Such attributes allow applications 230 to identify whether a given timeseries represents a virtual data point or an actual data point, even though both types of data points can be handled in the same manner by applications 230.

Still referring to FIG. 2, web services platform 102 is shown to include several applications 230 including an energy management application 232, monitoring and reporting applications 234, and enterprise control applications 236. Although only a few applications 230 are shown, it is contemplated that applications 230 can include any of a variety of applications configured to use the derived timeseries generated by platform services 220. In some embodiments, applications 230 exist as a separate layer of web services platform 102 (i.e., separate from platform services 220 and software defined gateway 212). This allows applications 230 to be isolated from the details of how the IT data and OT data are collected and how the timeseries data and entity data are generated. In other embodiments, applications 230 can exist as remote applications that run on remote systems or devices (e.g., remote systems and applications, client devices, etc.).

Applications 230 can use the derived timeseries data to perform a variety data visualization, monitoring, and/or control activities. For example, energy management application 232 and monitoring and reporting application 234 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 236 can use the derived timeseries data to perform various control activities. For example, enterprise control application 236 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for IoT devices 203.

Software Defined Gateway

Figure 3:
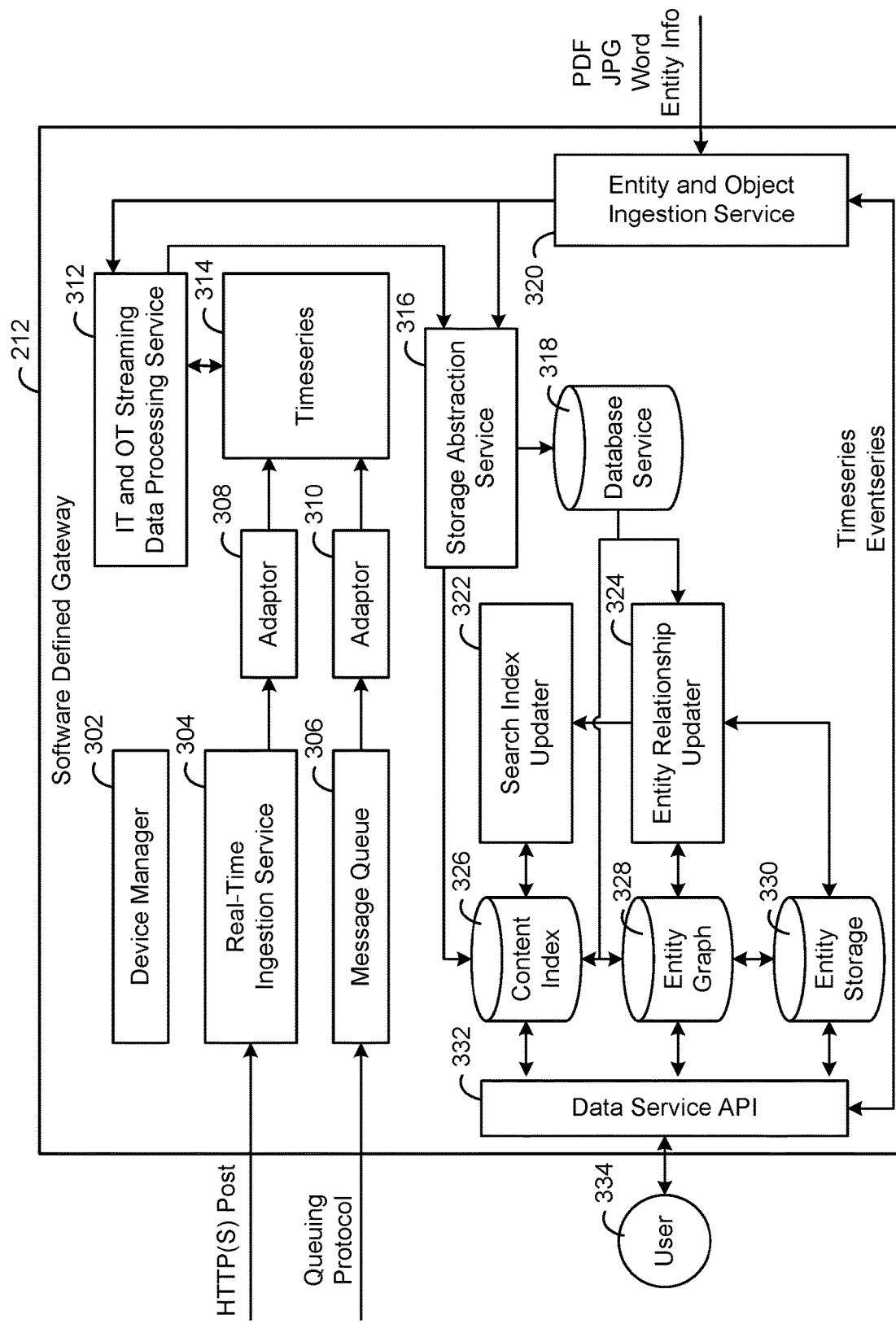
FIG. 3 is a block diagram illustrating the software defined gateway of FIG. 2 in greater detail, according to some embodiments.
Figure 4:
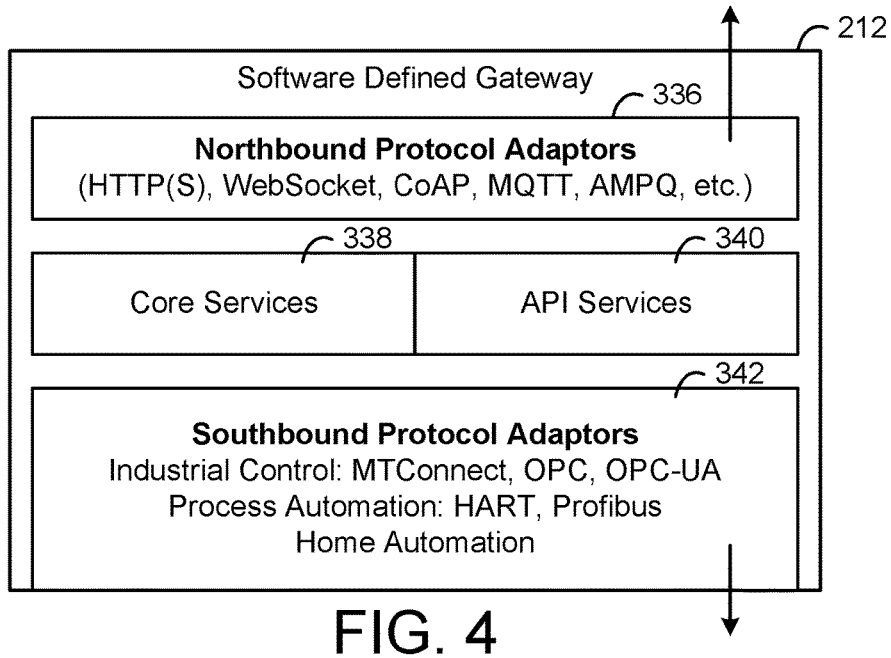
FIG. 4 is another block diagram illustrating the software defined gateway of FIG. 2 in greater detail, according to some embodiments.
Figure 5:
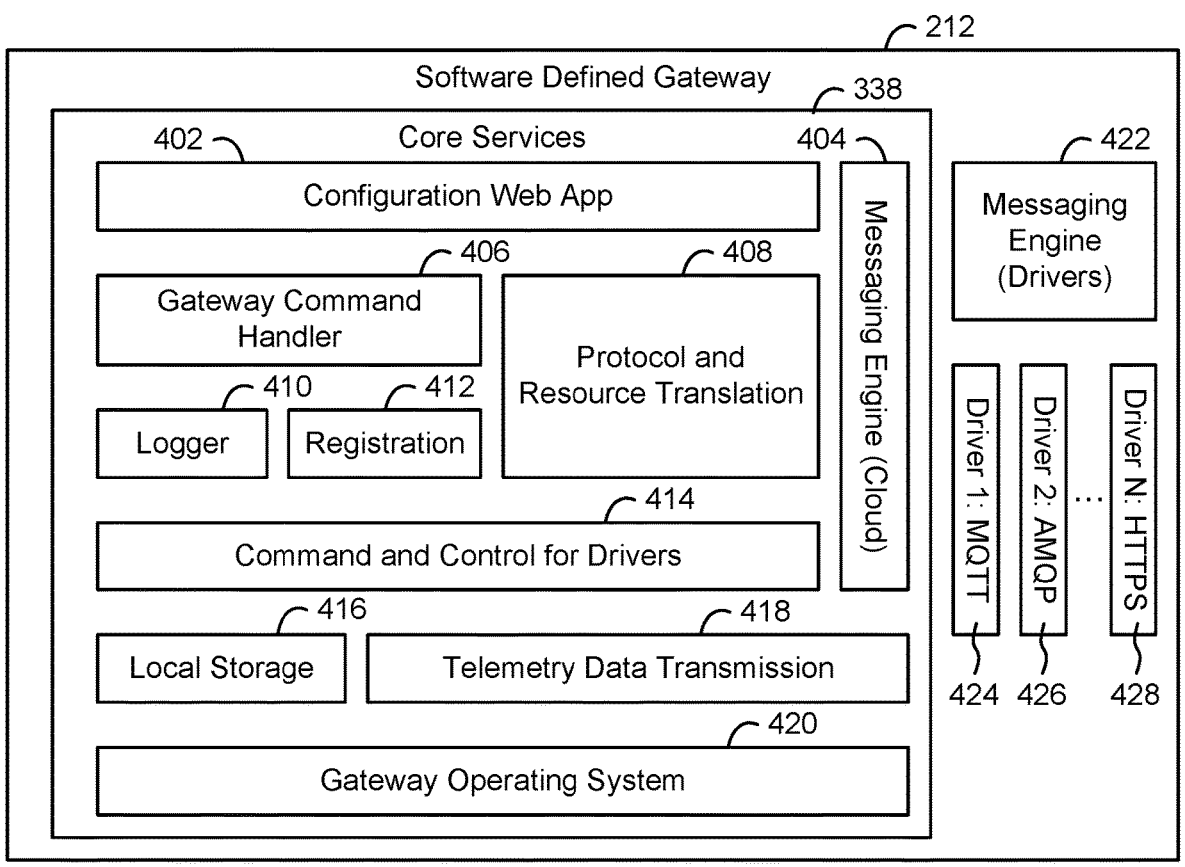
FIG. 5 is another block diagram illustrating the software defined gateway of FIG. 2 in greater detail, according to some embodiments.

Referring now to FIGS. 3-5, block diagrams illustrating software defined gateway 212 in greater detail is shown, according to an exemplary embodiment. Unlike a traditional hardware gateway, software defined gateway 212 may be implemented entirely as software components. Software defined gateway 212 may be responsible for collecting data from sensors, IoT devices, and other external systems and devices, as previously described. Software defined gateway 212 can store the collected data until the data can be processed by platform services 220 and sent to applications 230 via a target data transmission protocol.

In some embodiments, software defined gateway 212 includes software intelligent data transmission algorithms to decide if the data at a given stage of processing should be temporary, persistent, or kept in-memory. Intelligent data transmission can be used for optimizing data transmission cost when cellular network services are used. In some embodiments, software defined gateway 212 is fault tolerant and has disaster recovery. For example, software defined gateway 212 can be configured to compensate for a power outage or network connection loss that may result in an interruption of gateway processing. Software defined gateway 212 can be bootstrapped and started automatically as soon as power returns or network connection restores to the device, and can resume work from the point at which it was interrupted. Software defined gateway 212 can be configured to handle system logging and can balance the number of log entries stored on by software defined gateway 212 with the number of log entries sent for external storage.

Referring specifically to FIG. 3, software defined gateway 212 is shown to include a device manager 302. Device manager 302 can be configured to identify smart connected devices that send data to web services platform 102. In some embodiments, device manager 302 identifies smart connected devices via a token sent by the smart connected devices and/or via any other login credential. For example, the token may be an encrypted key that device manager 302 can decrypt. Based on the identity of a device of the smart connected devices, device manager 302 may allow the device to retrieve data and/or software stored by web services platform 102. Device manager 302 can be further configured to generate control signals for smart connected devices and/or otherwise control the functionality of smart connected devices. In some embodiments, device manager 302 is configured to perform manifest updating and/or software updating. For example, device manager 302 can be configured to store a manifest for smart connected devices and/or store software files. In this regard, device manager 302 can store and/or retrieve data (e.g., a manifest) and can update the manifest and/or software.

In some embodiments, device manager 302 manages virtual representations of various devices that communicate with web services platform 102. The virtual representations may be a type of smart entity (e.g., "digital twins" or "shadows") that represent physical devices and can be stored in entity storage 330. The smart entities may track various information regarding the physical devices that they represent. In some embodiments, device manager 302 is configured to update the smart entities when new IT data or OT data that affects the smart entities are received.

Still referring to FIG. 3, software defined gateway 212 is shown to include a real-time ingestion service 304 and a message queue 306. Real-time ingestion service 304 can be configured to receive and handle HTTP(S) posts and other types of real-time data, whereas message queue 306 can be configured to receive and handle messages received via a queuing protocol. In some embodiments, the data received via real-time ingestion service 304 and message queue 306 includes timeseries data and other types of OT data collected by software defined gateway 212 in real-time. Adaptors 308 and 310 can translate the data received via real-time ingestion service 304 and message queue 306 and store the data as timeseries 314. In some embodiments, IT and OT streaming data processing service 312 interacts with timeseries 314 to process the IT data, OT data, and/or other types of data used to generate timeseries 314.

Software defined gateway 212 is shown to include an entity and object ingestion service 320. Entity and object ingestion service 320 can be configured to receive and handle incoming IT data. For example, entity and object ingestion service 320 can be configured to receive PDF data, image data (e.g., JPG, PNG, BMP, etc.), video data, word data, entity information, and/or other types of IT data, as previously described. Entity and object ingestion service 320 can provide the IT data to IT and OT streaming data processing service 312 for further processing and/or to storage abstraction service 316. Storage abstraction service 316 can be configured to store the processed IT and OT data using database service 318. Storage abstraction service 316 can also create and store an index of the processed IT and OT data in content index 326.

Search index updater 322 can use the index information stored in content index 322 to update a search index for the IT and OT data. Entity relationship updater 324 can be configured to determine whether the IT data defines new entity relationships by comparing the IT data with entity graph 328. If new entity relationships are detected, entity relationship updater 324 can update the entity relationships in entity graph 328. Entity relationship updater 324 can also store updated entity information in entity storage 330. Data service API 332 can be configured to interface with content index 326, entity graph 328, and entity storage 330 to allow the indexed content, entity graph, and entities to be viewed, queried, retrieved, or otherwise presented to a user 334 or other external system, device, or service. Data service API 332 can also interface with entity and object ingestion service 320 to access timeseries data and eventseries data.

Referring now to FIG. 4, software defined gateway 212 is shown to include northbound protocol adaptors 336, southbound protocol adaptors 342, core services 338, and API services 340. Southbound protocol adaptors 342 may be responsible for the discovery of connected sub-systems including sensors and actuators and for collecting data. Southbound protocol adaptors 342 can be configured to communicate and translate data using industrial control protocols (e.g., MTConnect, OPC, OPC-UA, etc.), process automation protocols (e.g., HART, Profibus, etc.), home automation protocols, or any of a variety of other protocols.

In some embodiments, southbound protocol adaptors 342 are configured to connect non-IP and LAN-based IP devices and collect data (e.g., pulling data from legacy devices). Southbound protocol adaptors 342 may include plug-in software architecture plays to provide extensibility. Each of southbound protocol adaptors 342 can provide a set of common operations and data models, which allows a software defined gateway 212 to communicate and exchange data with a variety of different types of devices that use different communication protocols. In some embodiments, southbound protocol adaptors 342 include protocol drivers that provide various common operation interfaces via APIs or inter-process communication. For example, southbound protocol adaptors 342 can manage driver processes including start, stop, restart and kill driver processes. Southbound protocol adaptors 342 manage diver configuration data including passing initial configuration data to the driver process, as well as reconfiguration requests. Southbound protocol adaptors 342 can request sub-system discovery, request data reading and subscription of specific data points, and can request driver performance and status information.

In some embodiments, southbound protocol adaptors 342 include a host process that manages protocol drivers responsible for posting collected data to core services 338. This allows software defined gateway 212 to optimize the data aggregation, enrichment and transmission at a given stage of processing (e.g., be temporary, persistent, or kept in-memory) and computational constraints. Core services 338 can perform appropriate message aggregation, enrichment, transformation, and transmission to allow web services platform 102 to store and process the collected data. API services 340 can be configured to interface with other systems, devices, and processes to allow interaction with core services 338 and other components of software defined gateway 212.

Northbound protocol adaptors 336 can be configured to communicate and translate data using various other protocols (e.g., HTTP(S), WebSocket, CoAP, MQTT, etc.) to allow web services platform 102 to interact with systems and devices using such communications protocols. In some embodiments, northbound protocol adaptors 336 are responsible for sending data to cloud services via a standard protocol such as HTTP(S), AMQP and/or MQTT.

Figures 6, 7:
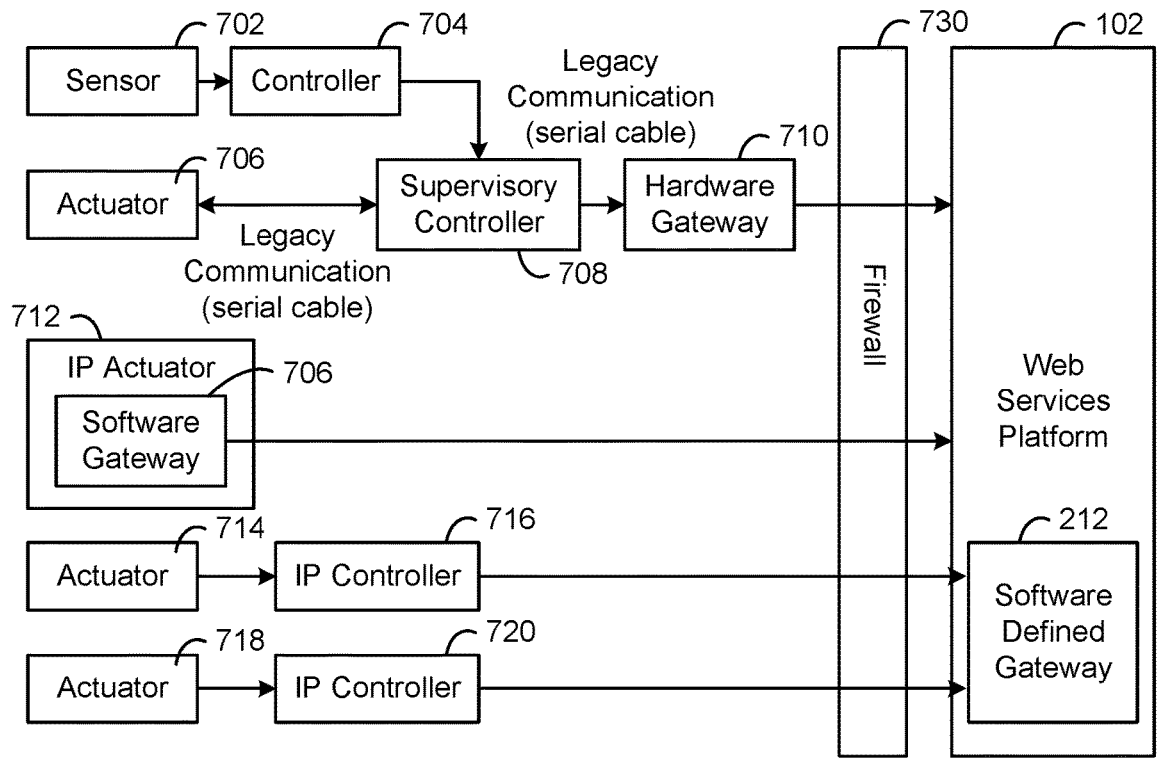
FIG. 6 is an image of a user interface which can be generated by the software defined gateway of FIG. 2, according to some embodiments.
FIG. 7 is a block diagram illustrating several gateway deployment topologies, according to some embodiments.

Referring now to FIG. 5, core services 338 are shown to include a configuration web application 402. Configuration web application 402 may be a web-based application that allows for configuration of software defined gateway 212. Configuration web application 402 may allow a user to view, set, or adjust the network configuration for both WAN and LAN, drivers, users, trending or telemetry data setup. An example of an interface 600 which can be generated and presented by configuration web application 402 is shown in FIG. 6. It should be understood that any application or feature described herein as being web-based or cloud-based could alternatively be implemented within software (e.g., an app) resident on a device without departing from the scope of the present disclosure.

Gateway command handler 406 can be configured to provide an interface that allows a remote user or application to perform gateway management and unified driver management operations. For example, gateway command handler 406 allows an operator to update gateway software remotely, modify or create configuration through a unified gateway and connected device management console. A management console can use gateway command handler 406 to manage many connected gateway devices. Logger 410 can be configured to perform system logging for performance optimization and diagnostics purposes. Registration 412 can be configured to register and provision software defined gateway 212 as a connected IoT device.

Protocol and resource translation 408 can be configured to expose legacy data points (i.e., a resource) as a trend to the platform services 220. Protocol and resource translation 408 can also expose legacy data points to be updated from remote mobile applications and make such points accessible from internet protocols (e.g., a resource in RESTful protocol). Accordingly, protocol and resource translation 408 can provide a mechanism to create a virtual resource accessible via IoT service and to perform real-time semantic mediation between a legacy system's resource and a corresponding virtual resource while maintaining uniform semantics. For example, a temperature reading from a legacy temperature sensor is typically not accessible via the internet. However, protocol and resource translation 408 can create a virtual resource (e.g., a RESTful endpoint) and make it available to IoT services and applications. This could be a simple mapping table or complex translation service.

Command and control for drivers 414 can be configured to facilitate communication between IoT services and legacy systems through a series of abstraction layers and services. Such command and control abstraction provides uniform management capabilities among various protocol adapters (or called protocol drivers). Command and control for drivers 404 can provide a set of instructions including start, stop, restart, and kill driver process. Command and control for drivers 404 can provide notifications of driver configuration (e.g., IP address of IoT device) to driver process to allow a driver to update its operating configuration. Command and control for drivers 404 can also perform sub-system discovery requests, on-demand data reading from the legacy device, and inquiries of driver performance and status.

Core services 338 is shown to include two distinct messaging engines 404 and 322. Messaging engine 404 can be configured to provide messaging between software defined gateway 212 and a cloud service, whereas messaging engine 422 can be configured to provide messaging between software defined gateway 212 and various driver plug-ins (e.g., an MQTT driver 424, a AMQP driver 426, a HTTPS driver 428, etc.). Messaging engine 422 is more closely related to inter-process communication among gateway core services 338 and protocol drivers 424-428. Messaging engine 414 can be implemented with inter-process communication techniques including pipe, message queue, and shared memory. Messaging engine 422 can be implemented with a standard IoT messaging protocols (e.g., MQTT, AMQP, HTTP(S), etc.).

Local storage 416 can be configured to store data locally within core services 338. Telemetry data transmission 418 can be configured to transmit data to remote systems and devices for remote storage. Gateway operating system 420 provides an operating environment in which the other components, services, and modules of software defined gateway 212 operate.

Gateway Deployment Topology

Referring now to FIG. 7, a block diagram illustrating several different gateway deployment topologies is shown. A gateway is not just a pass-through proxy device that forwards data from sensors or other devices to services. Sending all the information collected by devices to backend services would be highly ineffective in terms of performance and network utilization. An IoT gateway can perform certain pre-processing of information close to a data source before they're sent to the cloud service. Examples of pre-processing include message filtering, simple pattern detection, and aggregation.

FIG. 7 shows three types of gateway deployments: a hardware gateway 710, a software gateway 706, and a software defined gateway 212. Hardware gateway 710 is implemented as a hardware device installed on site with the equipment that sends data to gateway 710. For example, sensor 702 sends measurements to controller 704. Controller 704 and actuator 706 communicate with a supervisory controller 708 using legacy communication (e.g., a serial cable). Supervisory controller 708 communicates with hardware gateway 710, which sends data to web services platform 102 through a firewall 730.

Software gateway 706 is embedded into an IP-enabled device such as an IP actuator 712. IP actuator 712 uses a software gateway development SDK to make registration, provisioning, and telemetry of the embedded software gateway 706. In some embodiments, the SDK comes with common runtimes to make an IP device IoT gateway compliant. Software gateway 706 can be deployed as a virtual machine or as a containerized software component.

Software defined gateway 212 is implemented in the cloud as a software only option that uses legacy IP communication protocols via VPN tunneling. Software defined gateway 212 can perform protocol and message translation between legacy IP protocols and IoT messaging protocols. In addition, software defined gateway 212 can perform registration and provisioning of a legacy IP device into cloud services.

Gateway Software Update

Figure 8A:
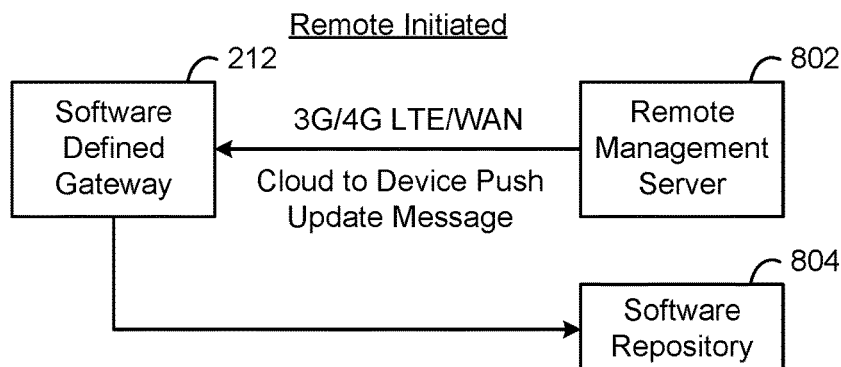
FIG. 8A is a block diagram illustrating a remote initiated gateway update process, according to some embodiments.
Figure 8B:
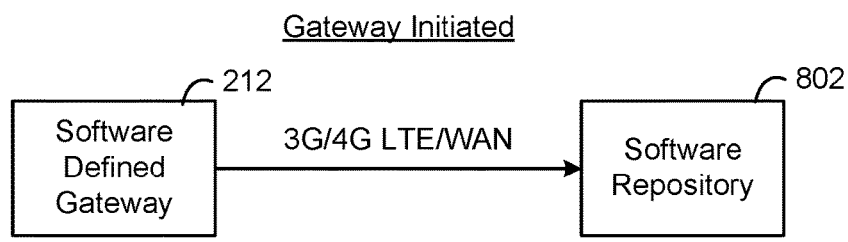
FIG. 8B is a block diagram illustrating a remote initiated gateway update process, according to some embodiments.
Figure 9:
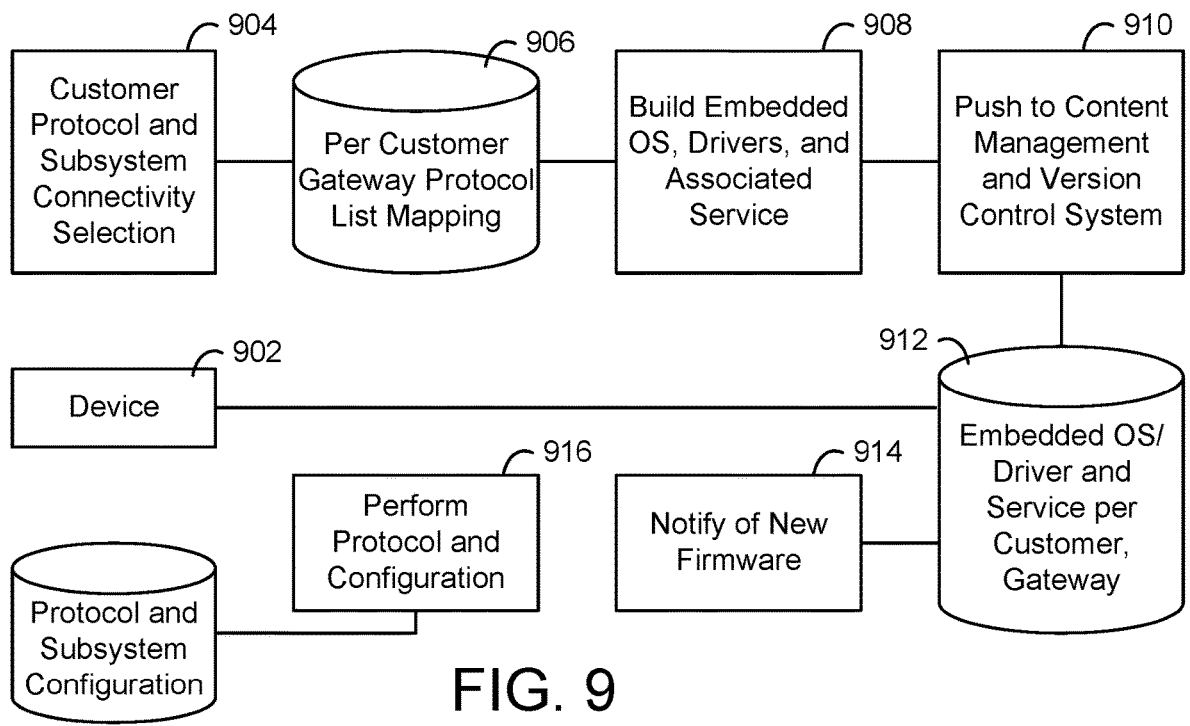
FIG. 9 is a block diagram illustrating another gateway update process, according to some embodiments.

Referring now to FIGS. 8A-9, block diagrams illustrating several techniques for updating the software of gateway 212 are shown, according to various exemplary embodiments. It may be desirable to update the software of gateway 212. After the development of the gateway software onto a device and delivery to the field, the ability to maintain and update gateway software may be limited. Accordingly, the ability to download software updates over-the-air is particularly advantageous from a security and a maintenance perspective, as it can minimize the delivery time of critical security fixes.

FIG. 8A illustrates a remote-initiated technique for updating the software of gateway 212. In this approach, a remote management server 802 pushes the proper version of the software to gateway 212. For example, remote management server 802 may send a notification to gateway 212 that a new software version is available. This requires update push action from remote management server 802. Gateway 212 can then connect to and retrieve the latest version of the gateway software from a software repository 804.

FIG. 8B illustrates a gateway-initiated technique for updating the software of gateway 212. In this approach, gateway 212 is responsible for connecting to software repository 804 and comparing the version of software installed on gateway 212 with the version of software available at software repository 804. If there is an update, gateway 212 can automatically download the latest version of the software. A software update monitoring agent can be installed in gateway 212 to communicate with remote management server 802 and/or software repository 804. This is the most scalable approach because it doesn't require any centralized coordination of the deployment action.

FIG. 9 illustrates a technique that can be used when not all protocol and/or subsystem connectivity protocols can be deployed in a single gateway software package. Some of the system connectivity protocols may require a larger server class machine to deploy. In this technique, a device identifies an embedded operating system/driver and service per customer gateway (step 902). The customer protocol and subsystem connectivity is selected (step 904) and the per customer gateway protocol list mapping is generated (step 906). Embedded operating system/drivers, and associated services are built (step 908) and published to a content management and version control system (step 910). The embedded operating system/driver and service per customer gateway is stored in a database (step 912) and the device is notified that there is new firmware (step 914). The protocol and subsystem configuration is then used to perform protocol and configuration (step 916).

Integration with Enterprise Applications

Figure 10:
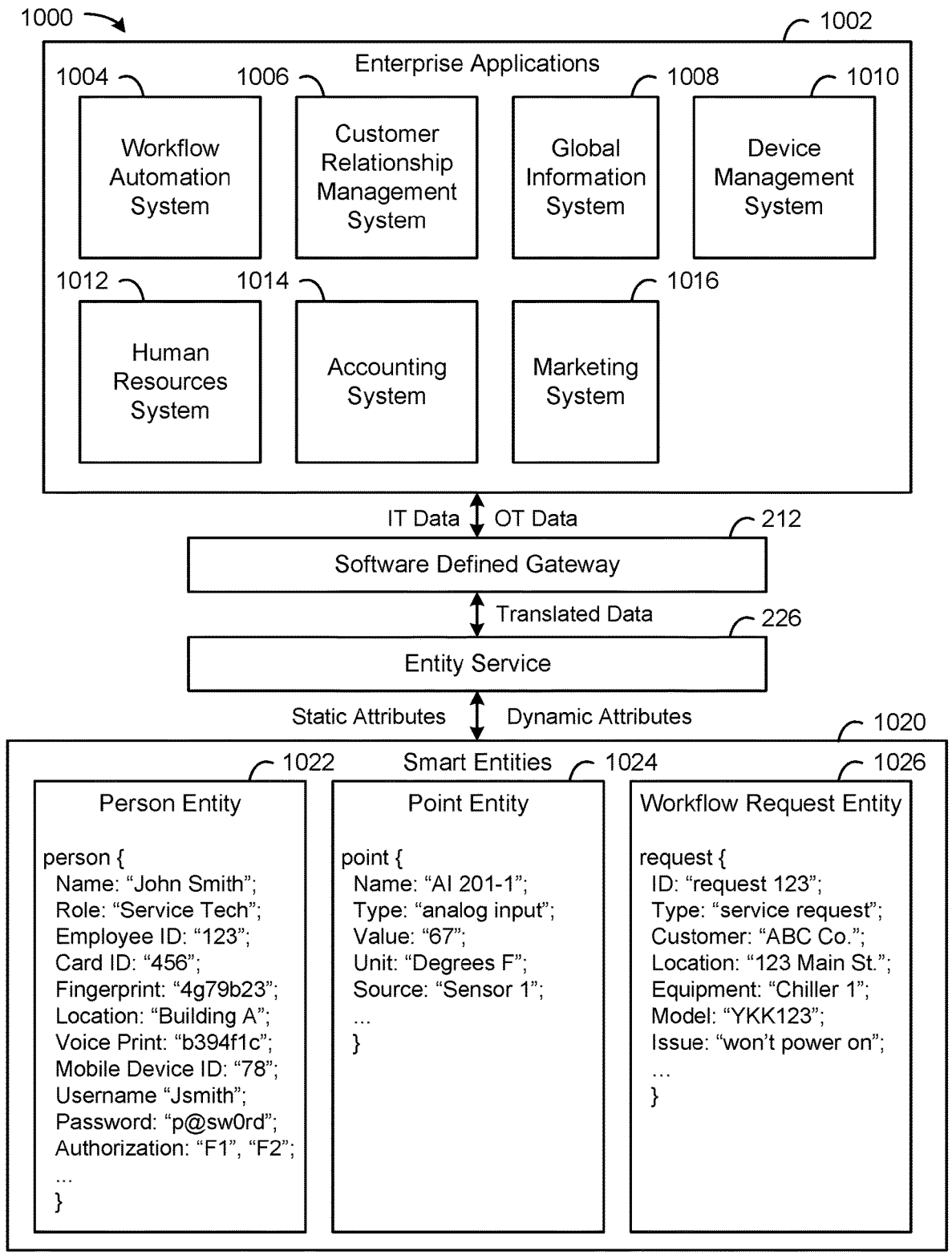
FIG. 10 is a block diagram of a system for integrating smart entities with enterprise applications, according to some embodiments.

Referring now to FIG. 10, a block diagram of a system 1000 is shown, according to an exemplary embodiment. System 1000 is shown to include enterprise applications 1002, software defined gateway 212, entity service 226, and smart entities 1020. As described above, software defined gateway 212 can be configured to receive IT data and OT data from a plurality of different data sources, translate the incoming IT data and OT data into a format or protocol used by data platform 102, and provide the translated IT data and OT data to entity service 226. In some embodiments, the data sources include various enterprise applications 1002 such as a workflow automation system 1004, a customer relationship management (CRM) system 1006, a global information system (GIS) 1008, a device management system 1010, a human resource system 1012, an accounting system 1014, and/or a marketing system 1016.

The IT data received from enterprise applications 1002 may include data that describes various entities (e.g., people, spaces, devices, etc.) and the relationships therebetween. For example, IT data from human resource system 1012 may include data that describes a set of employees and includes details about the employees (e.g., name, employee ID, job title/role, responsibilities, payroll information, address, etc.). IT data from device management system 1010 may include device information data that various IoT devices that communicate with web services platform 102.

Entity service 226 can use the incoming IT data to generate values for various static attributes of smart entities 1020. For example, entity service can use IT data from human resources system 1012 to populate and/or generate values for the static attributes of person entity 1022. The static attributes may describe a particular person that person entity 1022 represents. For example, the static attributes of person entity 1022 are shown to include a name attribute (e.g., "John Smith"), a role attribute (e.g., "Service Tech"), an employee ID attribute (e.g., "123"), a card ID attribute (e.g., "456"), and a plurality of other attributes that describe the static characteristics of a particular person. As another example, entity service can use IT data from device management system 1010 to populate and/or generate values for the static attributes of point entity 1022. The static attributes may describe a particular point (e.g., a temperature point). For example, the static attributes of point entity 1024 are shown to include a point name attribute (e.g., "AI 201-1"), a point type (e.g., "analog input"), a unit of measure (e.g., "Degrees F."), and a data source (e.g., "Sensor 1").

In some embodiments, the IT data received from enterprise applications 1002 include workflow requests. For example, workflow automation system 1004 can receive a request from a customer indicating that a particular piece of equipment requires service. Workflow automation system 1004 can create a work order based on the customer request and provide the work order to web services platform 102 via software defined gateway 212. Entity service 226 can translate the incoming work order into a workflow request entity 1026 that includes a plurality of attributes that describe the work order. For example, workflow request entity 1026 is shown to include an ID attribute uniquely identifying the request (i.e., "request 123"), a type attribute that indicates the type of request (e.g., "service request"), a customer attribute indicating a customer associated with the request (e.g., "ABC Co."), a location attribute indicating a location at which service is requested (e.g., "123 Main St."), an equipment attribute identifying the equipment requiring service (e.g., "Router 1"), a model attribute identifying a model number of the equipment requiring service (e.g., "ABC123"), and an issue attribute indicating why the equipment requires service (e.g., "won't power on").

The OT data received from enterprise applications 1002 may include data that is generated and/or updated in real-time as a result of operating the systems and devices that provide data to web services platform 102. For example, OT data may include timeseries data received from device management system 1010 (e.g., sensor measurements, status indications, alerts, notifications, etc.), weather information received from weather service 152, a news feed received from news service 154, document updates received from document service 156, media updates received from media service 158, and/or other types of telemetry data. In general, OT data can be described as real-time operational data or streaming data whereas IT data can be described as institutional or contextual data that is not continuously updated. For example, the OT data associated with a particular sensor may include measurements from the sensor, whereas the IT data associated with the sensor may include the sensor name, sensor type, and sensor location.

Entity service 226 can use the incoming OT data to derive or generate values for one or more dynamic attributes of smart entities 1020. For example, the "Location" attribute of person entity 1022 may indicate the current location of the person represented by person entity 1022. Entity service 226 can use the incoming OT data from a mobile device carried by a person to determine the current location of the person and can update the location attribute of person entity 1022 accordingly. Similarly, the "Value" attribute of point entity 1024 may indicate the current value of the temperature point represented by point entity 1024. Entity service 226 can use the incoming OT data from a temperature sensor to determine the current value of the temperature point (e.g., "67") and can update the value attribute of point entity 1024 accordingly.

As shown in FIG. 10, the integration of enterprise applications 1002 with smart entities 1020 is bidirectional. In the inbound direction, incoming IT data and OT data from enterprise applications 1002 can be ingested by software defined gateway 212 and converted into static and dynamic attributes of smart entities 1020 by entity service 226. In the outbound direction, the attributes of smart entities 1020 can be read by entity service 226 and translated into IT data and OT data by software defined gateway 212. In some embodiments, software defined gateway 212 translates the outbound IT data and OT data into a protocol or format used by enterprise applications 1002. The translated IT data and OT data can then be provided to enterprise applications 1002 for use in performing an activity or process managed by enterprise applications 1002 (e.g., building management, device management, customer management, personnel management, etc.).

Smart Entities and Entity Service

Figure 11:
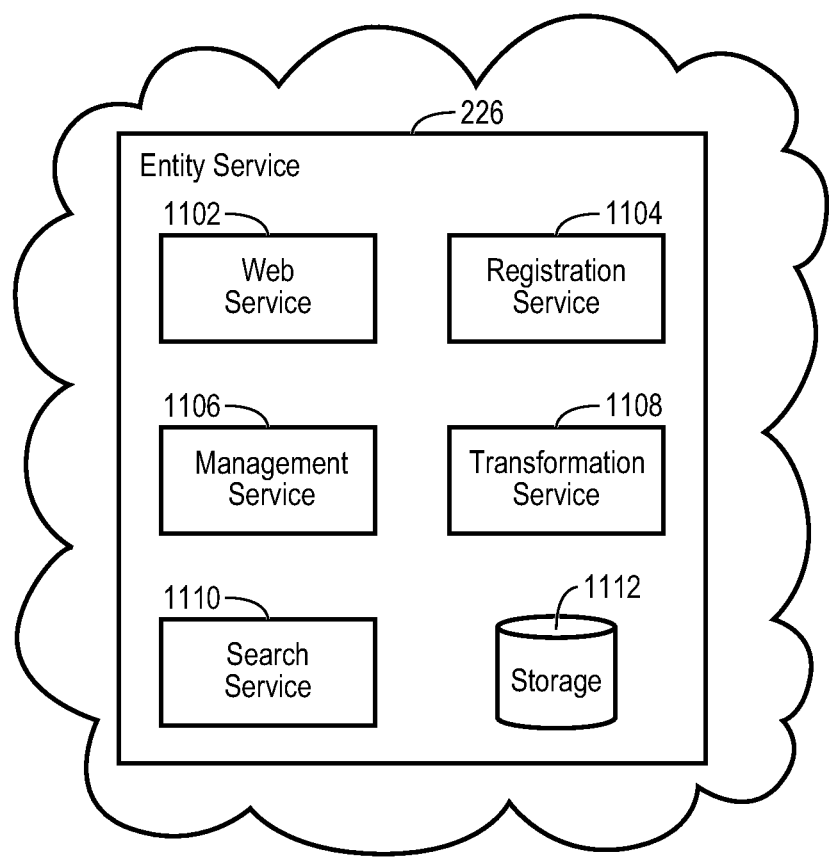
FIG. 11 is a block diagram illustrating an entity service of FIG. 2 in greater detail, according to some embodiments.

Referring now to FIG. 11, a block diagram illustrating entity service 226 in greater detail is shown, according to some embodiments. Entity service 226 is a component of web services platform 102 that processes the incoming IT data and OT data collected via software defined gateway 212. In some embodiments, entity service 226 uses the IT data and OT data to create or update various types of entities. Entity service 226 registers and manages various devices and entities in platform services 220. According to various embodiments, an entity may be any person, place, or physical object, hereafter referred to as an object entity. Further, an entity may be any event, data point, or record structure, hereinafter referred to as data entity. In addition, relationships between entities may be defined by relational objects.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). In some embodiments, the static attribute is derived from the IT data received via software defined gateway 212. The dynamic attribute may include a property of the object entity that changes over time (e.g., location, age, measurement, data point, and the like). In some embodiments, the dynamic attribute is derived from the OT data received via software defined gateway 212. In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point is received for the object entity (e.g., a new sample of OT data is received via software defined gateway 212), only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, consider an embodiment in which periodic odometer readings are received from a connected car as a type of OT data. An object entity corresponding to the car could include the last odometer reading and a link to a data entity that stores a series of the last ten odometer readings received from the car.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems, expected location or behavior given a time of day, tendencies or preferences based on connected activity data received by entity service 226 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (i.e., behavior of the device defined by its programming), and the like.

In some embodiments, the data entity may be defined as having at least a static attribute and a dynamic attribute. The static attribute of the data entity may include a unique identifier or description of the data entity. In some embodiments, the static attribute is based on the IT data received via software defined gateway 212. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. For example, the dynamic attribute is based on the OT data received via software defined gateway 212. In some embodiments, the dynamic attribute of the data entity may represent some other data that is analyzed, inferred, calculated, or determined based on data from a plurality of data sources.

In some embodiments, the relational object may be defined as having at least a static attribute. The static attribute of the relational object may semantically define the type of relationship between two or more entities. For example, in a non-limiting embodiment, a relational object for a relationship that semantically defines that Entity A has a part of Entity B, or that Entity B is a part of Entity A may include:

hasPart{Entity A,Entity B} where the static attribute hasPart defines what the relationship is of the listed entities, and the order of the listed entities or data fields of the relational object specifies which entity is the part of the other (e.g., Entity A→hasPart→Entity B).

In various embodiments, the relational object is an object-oriented construct with predefined fields that define the relationship between two or more entities, regardless of the type of entities. For example, platform services 220 can provide a rich set of pre-built entity models with standardized relational objects that can be used to describe how any two or more entities are semantically related, as well as how data is exchanged and/or processed between the entities. Accordingly, a global change to a definition or relationship of a relational object at the system level can be effected at the object level, without having to manually change the entity relationships for each object or entity individually. Further, in some embodiments, a global change at the system level can be propagated through to third-party applications integrated with IoT platform services 320 such that the global change can be implemented across all of the third-party applications without requiring manual implementation of the change in each disparate application.

Figure 12:
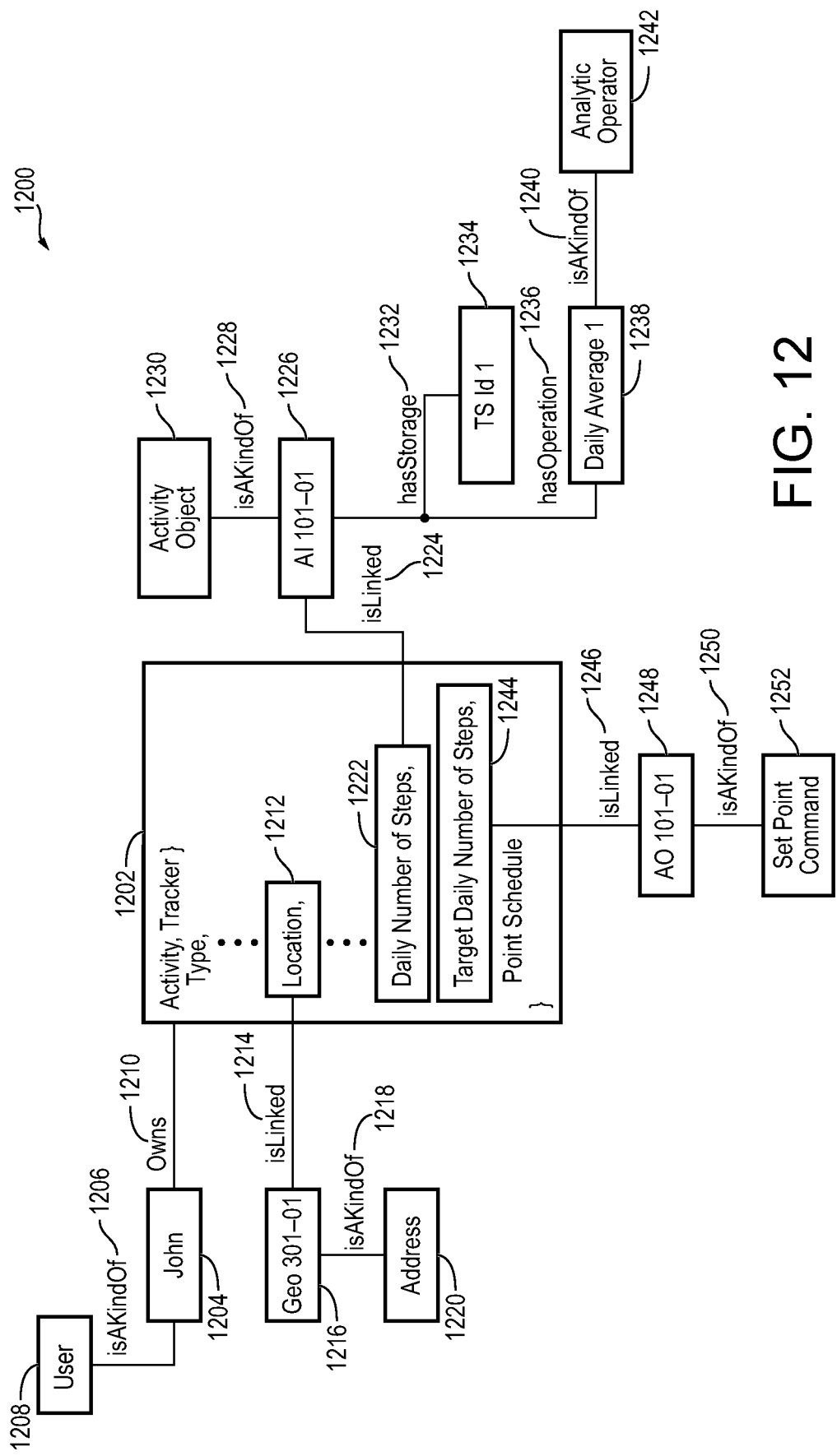
FIG. 12 in an example entity graph of entity data, according to some embodiments.

For example, referring to FIG. 12, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational objects that semantically define the relationships between the entities. The relational objects may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Activity Tracker" may be represented via the below schema:

```
Activity Tracker {
    Type,
    Model No,
    Device Name,
    Manufactured date,
    Serial number,
    MAC address,
    Location,
    Current Time,
    Current Date,
    Current Heart Rate,
    Daily Number of Steps,
    Target Daily Number of Steps,
    Point schedule
}
``` where various attributes are static attributes (e.g., "Type," "Model Number," "Device Name," etc.), dynamic attributes (e.g., "Location," "Current Time," etc.), or behavioral attributes (e.g., "Current Heart Rate," "Daily Number of Steps," etc.) for the object entity "Activity Tracker." In a relational database, the object "Activity Tracker" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)123-4567 | 36 | Home | Engineer | where various attributes are static attributes (e.g., "First Name," "Last Name," etc.), dynamic attributes (e.g., "Age," "Location," etc.), or behavioral attributes (e.g., "Engineer") for the object entity "John Smith."

An example data entity for the data point "Daily Number of Steps" for the "Activity Tracker" owned by John Smith in a relational database may be represented by the below table:

| Present-Value | Description | Device_Type | Unit of measure |
|---|---|---|---|
| 2365 | "John's current daily number of steps" | Activity Tracker | 2 feet/step | where various attributes are static attributes (e.g., "Description" and "Device_Type") and dynamic attributes (e.g., "Present-Value").

While structuring the entities via entity type or object may help to define the data representation of the entities, these data models do not provide information on how the entities relate to each other. For example, an IoT application, controller, or platform may need data from a plurality of sources as well as information on how the sources relate to each other in order to provide a proper decision, action, or recommendation. Accordingly, in various embodiments, the entity data further includes the relational objects to semantically define the relationships between the entities, which may help to increase speeds in analyzing data, as well as provide ease of navigation and browsing. In some embodiments, the entity relationship specified by the relational objects are derived from the IT data received via software defined gateway 212.

For example, still referring to FIG. 12, an entity graph 1200 for the Activity Tracker object entity 1202 includes various class entities (e.g., User, Address, SetPoint Command, and Activity Object), object entities (e.g., John and Activity Tracker), relational objects (e.g., isAKindOf, Owns, isLinked, hasStorage, and hasOperation), and data entities (AI 201-01, TS ID 1, Daily Average 1, AO 101-1, and Geo 301-01). The relational objects describe the relationships between the various class, object, and data entities in a semantic and syntactic manner, so that an application or user viewing the entity graph 1200 can quickly determine the relationships and data process flow of the Activity Tracker object entity 1202, without having to resort to a data base analyst or engineer to create, index, and/or manage the entities (e.g., using SQL or NoSQL). In some embodiments, each of the entities (e.g., class entity, object entity, and data entity) represents a node on the entity graph 1200, and the relational objects define the relationships or connections between the entities (or nodes).

For example, the entity graph 1200 shows that a person named John (object entity) 1204 isAKindOf (relational object) 1206 User (class entity) 1208. John 1204 Owns (relational object) 1210 the Activity Tracker (object entity) 1202. The Activity Tracker 1202 has a location attribute (dynamic attribute) 512 that isLinked (relational object) 1214 to Geo 301-01 (data entity) 1216, which isAKindOf (relational object) 1218 an Address (class entity) 1220. Accordingly, Geo 301-01 1216 should have a data point corresponding to an address.

The Activity Tracker 1202 further includes a "Daily Number of Steps" attribute (dynamic attribute) 1222 that isLinked (relational object) 524 to AI 201-01 (data entity) 526. AI 201-01 526 isAKindOf (relational object) 1228 Activity Object (class entity) 1230. Thus, AI 201-01 1226 should contain some sort of activity related data. AI 201-01 1226 hasStorage (relational object) 532 at TS ID 1 (data entity) 1234. AI 201-01 1226 hasOperation (relational object) 1236 of Daily Average 1 (data entity) 1238, which isAKindOf (relational object) 1240 Analytic Operator (class entity) 1242. Accordingly, Daily Average 1 should hold some data that is the result of an analytic operation.

In this example, the data entity AI 201-01 1226 may be represented by the following data model:

```
point {
    name: "AI 201-01";
    type: "analog input";
    value: 2365;
    unit: "2 feet/step";
    source: "Pedometer Sensor 1"
}
``` where "point" is an example of a data entity that may be created by platform services 220 to hold the value for the linked "Daily Number of Steps" 1222 dynamic attribute of the Activity Tracker entity 1202, and source is the sensor or device in the Activity Tracker device 1202 that provides the data to the linked "Daily Number of Steps" 1222 dynamic attribute.

The data entity TS Id 1 1234 may be represented, for example, by the following data model:

```
timeseries {
    name: "TS Id 1";
    type: "Daily Average";
    values: "[2365, 10683, 9166, 8254, 12982];
    unit: "2 feet/step";
    point: "AI 201-01";
    source: "Daily Average 1"
}
``` where the data entity Daily Average 1 1238 represents a specific analytic operator used to create the data entity for the average daily timeseries TS Id 1 1234 based on the values of the corresponding data entity for point AI 201-01 1226. The relational object hasOperation shows that the AI 201-01 data entity 1226 is used as an input to the specific logic/math operation represented by Daily Average 1 538. TS Id 1 1234 might also include an attribute that identifies the analytic operator Daily Average 1 1238 as the source of the data samples in the timeseries.

Still referring to FIG. 12, the entity graph 1200 for Activity Tracker 1202 shows that the "Target Daily Number of Steps" attribute (dynamic attribute) 1244 isLinked (relational attribute) 1246 to the data entity AO 101-01 (data entity) 1248. AO 101-01 data entity isAKindOf (relational attribute) 1250 a SetPoint Command (class entity) 1252. Thus, the data in data entity AO 101-01 1248 may be set via a command by the user or other entity. Accordingly, in various embodiments, entity graph 1200 provides a user friendly view of the various relationships between the entities (or nodes) and data processing flow, which provides for ease of navigation, browsing, and analysis of data.

In some embodiments, any two entities (or nodes) can be connected to each other via one or more relational objects that define different relationships between the two entities (or nodes). For example, still referring to FIG. 12, the object entity John 1204 is shown to be connected to the object entity Activity Tracker 1202 via one relational object Owns 1210. However, in another embodiment, the object entity John 1204 can be connected to the object entity Activity Tracker 1202 via more than one relational object, such that, in addition to the relational object Owns 1210, another relational object can define another relationship between the object entity John 1204 and the object entity Activity Tracker 1202. For example, another relational object such as isWearing or isNotWearing can define whether or not John (or the entity object for John 1204) is currently wearing (e.g., via the relational object isWearing) or currently not wearing (e.g., via the relational object isNotWearing) the activity tracker (or the entity object for the activity tracker 1202).

In this case, when the data entities associated with the activity tracker object entity 1202 indicates that John is wearing the activity tracker (e.g., which may be determined from the daily number of steps attribute 1222 or the location attribute 1212), the relational object isWearing may be created between the object entity for John 1210 and the object entity for activity tracker 1202. On the other hand, when the data entities associated with the activity tracker object entity 1202 indicates that John is not wearing the activity tracker (e.g., which may be determined when the daily number of steps attribute 1222 for a current day is zero or the location attribute 1212 shows a different location from a known location of John), the relational object isNotWearing can be created between the object entity for John 1210 and the object entity for activity tracker 1202. For example, the relational object isNotWearing can be created by modifying the relational object isWearing or deleting the relational object isWearing and creating the relational object isNotWearing. Thus, in some embodiments, the relational objects can be dynamically created, modified, or deleted as needed or desired.

Referring again to FIG. 11, entity service 226 may transform the incoming IT data and OT data received via software defined gateway 212 into data corresponding to entity data. For example, as discussed above with reference to FIG. 12, entity service 226 can create data entities that use and/or represent data points in the OT data. Entity service 226 includes a web service 1102, a registration service 1104, a management service 1106, a transformation service 1108, a search service 1110, and storage 1112. In some embodiments, storage 1112 may be internal storage or external storage. For example, storage 1112 may be entity storage 216 (see FIG. 2), internal storage with relation to entity service 226, and/or may include a remote database, cloud-based data hosting, or other remote data storage.

Web service 1102 can be configured to interact with web-based applications to send entity data and/or receive raw data (e.g., IT data, OT data, data samples, timeseries data, and the like). For example, web service 1102 can provide an interface (e.g., API, UI/UX, and the like) to manage (e.g., register, create, edit, delete, and/or update) an entity (e.g., class entity, object entity, data entity, and/or the like) and the relational objects that define the relationships between the entities. In some embodiments, web service 1102 provides entity data to web-based applications. For example, if one or more of applications 230 are web-based applications, web service 1102 can provide entity data to the web-based applications.

In some embodiments, web service 1102 receives raw data samples and/or raw timeseries data including device information from a web-based data collector, or a web-based security service to identify authorized entities and to exchange secured messages. For example, if software defined gateway 212 is a web-based application, web service 1102 can receive the raw data samples and/or timeseries data including a device attribute indicating a type of device (e.g., IoT device) from which the data samples and/or timeseries data are received from software defined gateway 212. In some embodiments, web service 1102 may message security service 222 to request authorization information and/or permission information of a particular entity or device. In some embodiments, entity service 226 processes and transforms the collected data to generate the entity data.

Registration service 1104 can perform registration of devices and entities. For example, registration service 1104 can communicate with IoT devices 203 (e.g., via web service 1102) to register each IoT device 203 with platform services 220. In some embodiments, registration service 1104 can be configured to create a virtual representation of each IoT device 203 in an IoT environment within platform services 220. In some embodiments, the virtual device representations are smart entities that include attributes defining or characterizing the corresponding physical IoT devices 203 and relational objects defining the relationship of the IoT device 203 with other devices.

Management service 1106 may create, modify, or update various attributes, data entities, and/or relational objects of the devices managed by platform services 220 for each entity rather than per class or type of entity. This allows for separate processing/analytics for each individual entity rather than only to a class or type of entity. Some attributes (or data entities) may correspond to, for example, the most recent value of a data point provided to platform services 220 as OT data. For example, the "Daily Number of Steps" dynamic attribute of the "Activity Tracker" object entity 1202 in the example discussed above may be the most recent value of a number of steps data point provided by the Activity Tracker device and can be received as a type of OT data provided by the Activity Tracker device. Management service 1106 can use the relational objects of the entity data for Activity Tracker to determine where to update the data of the attribute.

For example, management service 1106 may determine that a data entity (e.g., AI 201-01) is linked to the "Daily Number of Steps" dynamic attribute of Activity Tracker via an isLinked relational object. In this case, management service 1106 may automatically update the attribute data in the linked data entity. Further, if a linked data entity does not exist, management service 1106 can create a data entity (e.g., AI 201-01) and an instance of the isLinked relational object 1224 to store and link the "Daily Number of Steps" dynamic attribute of Activity Tracker therein. Accordingly, processing/analytics for activity tracker 1202 may be automated. As another example, a "most recent view" attribute (or linked data entity) of a webpage object entity may indicate the most recent time at which the webpage was viewed. Management service 1106 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, management service 1106 can use the relational objects in entity data to identify a related access control device (e.g., an electronic lock, a keypad, etc.) at the entrance/exit of a vehicle. Management service 1106 can use raw data received from the identified access control device to track the number of occupants entering and exiting the vehicle. Management service 1106 can update a "number of occupants" attribute (or corresponding data entity) of the vehicle object each time a person enters or exits the vehicle using a related card object entity, such that the "number of occupants" attribute (or data entity) reflects the current number of occupants within the vehicle. As another example, a "total revenue" attribute associated with a product line object entity may be the summation of all the revenue generated from related point of sales object entities. Management service 1106 can use the raw data received from the related point of sales object entities to determine when a sale of the product occurs, and can identify the amount of revenue generated by the sales. Management service 1106 can then update the "total revenue" attribute (or related data entity) of the product line object entity by adding the most recent sales revenue from each of the related point of sales object entities to the previous value of the attribute.

In some embodiments, management service 406 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 1106 can use relational objects of the person object entity to identify a mobile device carried by the person (e.g., a cell phone) to determine the physical location of the person at any given time. Management service 1106 can use weather data from a weather service in the region in which the building object entity is located to determine whether any severe weather is approaching the person's location. Similarly, management service 1106 can use information from police, news services, and the like to determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 1106 can use these and other types of data as inputs to a risk function that calculates the value of the person object entity's "risk" attribute and can update the person object entity (or related device entity of the person) accordingly.

In some embodiments, management service 1106 can be configured to synchronize configuration settings, parameters, and other device-specific information between the entities and platform services 220. In some embodiments, the synchronization occurs asynchronously. Management service 1106 can be configured to manage device properties dynamically. The device properties, configuration settings, parameters, and other device-specific information can be synchronized between the smart entities created by and stored within platform services 220.

In some embodiments, management service 1106 is configured to manage a manifest for each of the IoT devices. The manifest may include a set of relationships between the IoT devices and various entities. Further, the manifest may indicate a set of entitlements for the IoT devices and/or entitlements of the various entities and/or other entities. The set of entitlements may allow an IoT device and/or a user of the device to perform certain actions within the IoT environment (e.g., control, configure, monitor, and/or the like).

Still referring to FIG. 11, transformation service 1108 can provide data virtualization, and can transform various predefined standard data models for entities in a same class or type to have the same entity data structure, regardless of the device or thing that the entity represents. For example, each device entity under a device class may include a location attribute, regardless of whether or not the location attribute is used. Thus, if an application is later developed requiring that each device entity includes a location attribute, manual mapping of heterogenous data of different entities in the same class may be avoided. Accordingly, interoperability between IoT devices and scalability of IoT applications may be improved.

In some embodiments, transformation service 1108 can provide entity matching, cleansing, and correlation so that a unified cleansed view of the entity data including the entity related information (e.g., relational objects) can be provided. Transformation service 408 can support semantic and syntactic relationship description in the form of standardized relational objects between the various entities. This may simplify machine learning because the relational objects themselves provide all the relationship description between the other entities. Accordingly, the rich set of pre-built entity models and standardized relational objects may provide for rapid application development and data analytics.

Figure 13:
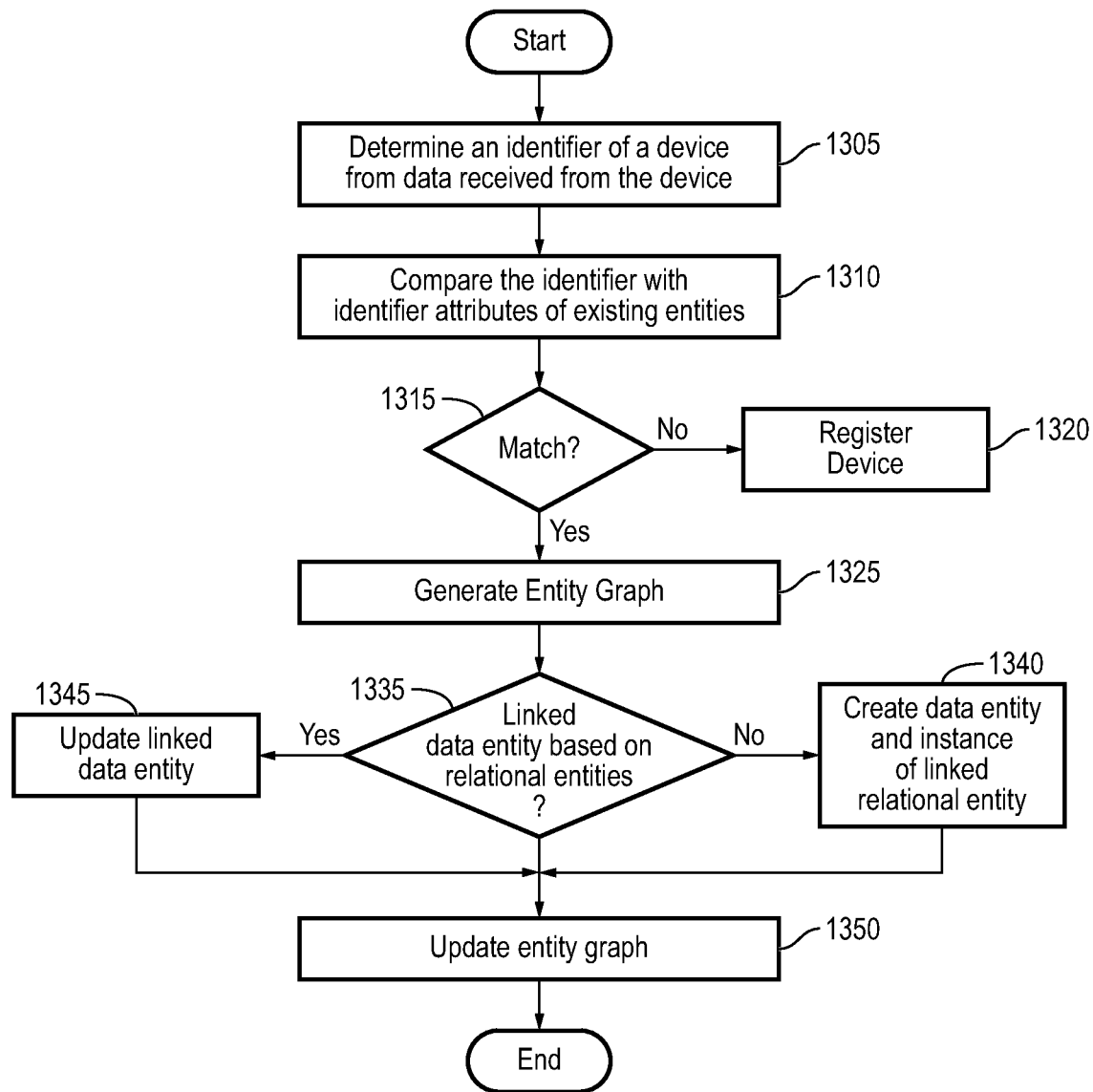
FIG. 13 is a flow diagram of a process or method for updating/creating an attribute of a related entity based on data received from a device, according to some embodiments.

For example, FIG. 13 shows a flow diagram of a process or method for updating/creating a data entity based on data received from a device, according to some embodiments. Referring to FIG. 13, the process starts, and when raw data and/or timeseries data is received from an IoT device, the transformation service 1108 may determine an identifier of the IoT device from the received data at block 1305. At block 1310, transformation service 1108 may compare an identity static attribute from the data with identity static attributes of registered object entities to locate a data container for the IoT device. If a match does not exist from the comparison at block 1315, transformation service 1108 may invoke the registration service to register the IoT device at block 1320. If a match exists from the comparison at block 1315, transformation service 1108 may generate an entity graph or retrieve entity data for the device at block 1325. From the entity graph or entity data, transformation service 1108 may determine if a corresponding data entity exists based on the relational objects (e.g., isLinked) for the IoT device to update a dynamic attribute from the data at block 1325. If not, management service 1106 may create a data entity for the dynamic attribute and an instance of a corresponding relational object (e.g., isLinked) to define the relationship between the dynamic attribute and created data entity at block 1340. If the corresponding data entity exists, management service 1106 may update the data entity corresponding to the dynamic attribute from the data at block 1345. Then, transformation service 1108 may update or regenerate the entity graph or entity data at block 1350, and the process may end.

Referring again to FIG. 11, search service 1110 provides a unified view of product related information in the form of the entity graph, which correlates entity relationships (via relational objects) among multiple data sources (e.g., CRM, ERP, MRP and the like). In some embodiments, search service 1110 is based on a schema-less and graph based indexing architecture. For example, in some embodiments, the search service 1110 provides the entity graph in which the entities are represented as nodes with relational objects defining the relationship between the entities (or nodes). Search service 1110 facilitates simple queries without having to search multiple levels of the hierarchical tree of the entity graph. For example, search service 1110 can return results based on searching of entity type, individual entities, attributes, or even relational objects without requiring other levels or entities of the hierarchy to be searched.

Figure 14:
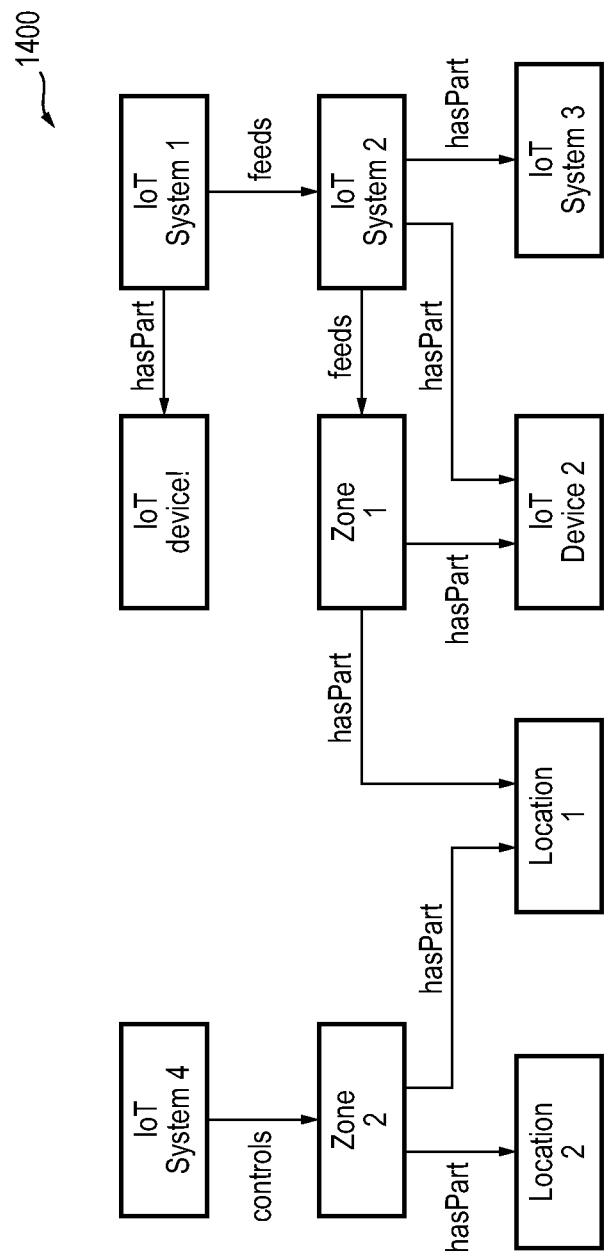
FIG. 14 is an example entity graph of entity data, according to some embodiments.

FIG. 14 is an example entity graph 1400 of entity data according to an embodiment of the present disclosure. The example of FIG. 14 assumes that a fault based application has detected a faulty measurement with respect to IoT device 2. However, IoT device 2 relies on various other systems and devices in order to operate properly. Thus, while the faulty measurement was detected with respect to IoT device 2, IoT device 2 itself may be operating properly. Accordingly, in order to pin point the cause of the faulty measurement, the fault based application may require additional information from various related IOT systems and devices (e.g., entity objects), as well as the zones and locations (e.g., entity objects) that the systems and devices are configured to serve, in order to properly determine or infer the cause of the faulty measurement.

Referring to FIG. 14, entity graph 1400 represents each of the entities (e.g., IoT device 2 and other related entities) as nodes on the entity graph 1400, and shows the relationship between the nodes (e.g., IoT device 2 and related entities) via relational objects (e.g., Feeds, hasPoint, hasPart, Controls, etc.). For example, entity graph 1400 shows that the entities related to IoT device 2 include a plurality of IoT systems 1-4, IoT device 1, zones 1 and 2, and locations 1 and 2, each represented as a node on the entity graph 1400. Further, the relational objects indicate that IoT device 2 provides a data point (e.g., hasPoint) to zone 1. Zone 1 is shown to service location 1 (e.g., hasPart), which is also serviced by zone 2 (e.g., hasPart). Zone 2 also services location 2 (e.g., hasPart), and is controlled by IoT system 4 (e.g., controls). IoT device 2 is shown to also provide a data point (e.g., hasPoint) to IoT system 2. IoT system 2 is shown to include IoT system 3 (e.g., hasPart), and feeds (e.g., Feeds) zone 1. Further, IoT system 2 is fed (e.g., Feeds) by IoT system 1, which receives a data point (e.g., hasPoint) from IoT device 1.

Accordingly, in the example of FIG. 14, in response to receiving the faulty measurement from IoT device 2, the fault based application and/or analytics service 224 can determine from entity graph 1400 that the fault could be caused by some malfunction in one or more of the other related entities, and not necessarily a malfunction of the IoT device 2. Thus, the fault based application and/or the analytics service 224 can investigate into the other related entities to determine or infer the most likely cause of the fault.

Figure 15:
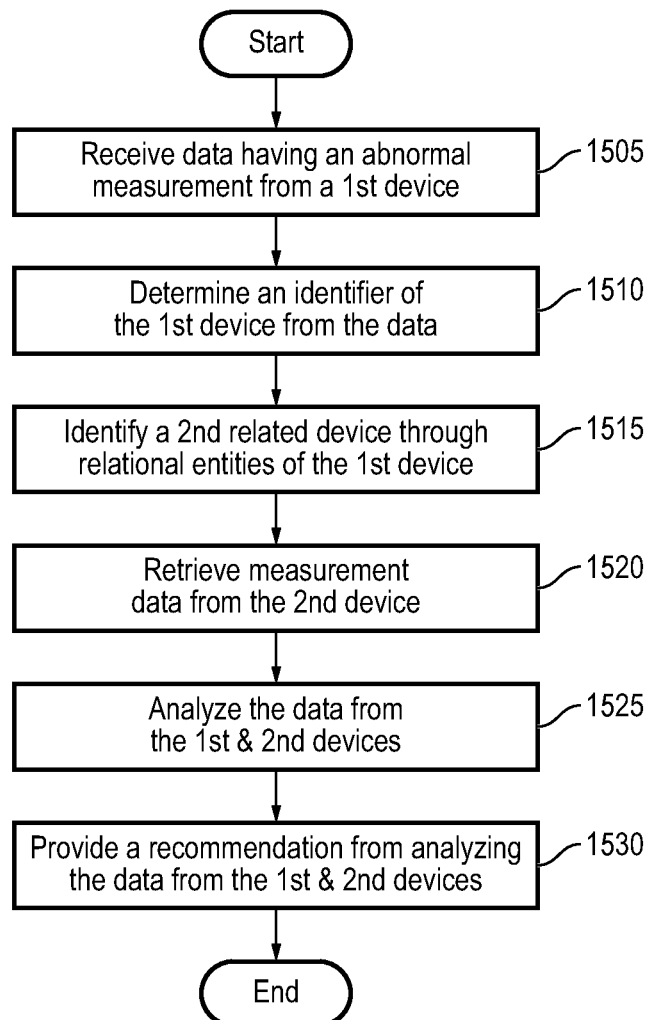
FIG. 15 is a flow diagram of a process or method for analyzing data from a second related device based on data from a first device, according to some embodiments.

For example, FIG. 15 is a flow diagram of a process or method for analyzing data from a second related device based on data from a first device, according to some embodiments. Referring to FIG. 15, the process starts and data including an abnormal measurement is received from a first device at block 1505. Transformation service 1108 determines an identifier of the first device from the received data at block 1510. Transformation service 1108 identifies a second device related to the first device through relational objects associated with the first device at block 1515. Transformation service 1108 invokes web service 1102 to retrieve measurement data from the second device at block 1520. Analytics service 224 analyzes the data from the first device and the second device at block 1525. Analytics service 224 provides a recommendation from the analysis of the data from each of the first device and the second device at block 1530, and the process ends.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. One or more non-transitory computer readable media containing program instructions that, when executed by one or more processors, cause the one or more processors to perform operations comprising:
   creating and managing a plurality of digital twins representing at least one of devices, people, or spaces, the plurality of digital twins associated with at least one of a plurality of attributes via a plurality of relationships, one relationship of the plurality of relationships relating one digital twin of the plurality of digital twins to one attribute of the plurality of attributes;
   receiving inbound data from one or more enterprise applications;
   translating the inbound data into a plurality of values for one or more of the plurality of attributes;
   writing the plurality of values to the plurality of attributes;
   reading the plurality of attributes of the plurality of digital twins;
   translating the plurality of attributes into outbound data; and
   providing the outbound data to the one or more enterprise applications.

2. The one or more non-transitory computer readable media of claim 1, wherein the program instructions cause the one or more processors to use a different communications protocol to communicate with each of the one or more enterprise applications.

3. The one or more non-transitory computer readable media of claim 1, wherein the program instructions cause the one or more processors to translate between a first communications protocol or format used by the one or more enterprise applications and a second protocol or format used by the plurality of digital twins.

4. The one or more non-transitory computer readable media of claim 1, wherein the one or more enterprise applications comprise at least one of a workflow automation system, a customer relationship management system, a global information system, a device management system, a human resources system, an accounting system, a marketing system, or a building management system.

5. The one or more non-transitory computer readable media of claim 1, wherein the one or more enterprise applications comprise a workflow automation system and the inbound data comprises a workflow request;
   wherein the program instructions cause the one or more processors to create a workflow request entity representing the workflow request and generate a plurality of workflow attributes of the workflow request entity using information contained in the workflow request.

6. The one or more non-transitory computer readable media of claim 1, wherein the plurality of digital twins are virtual representations of a physical system or device, person or group of people, or space or group of spaces.

7. The one or more non-transitory computer readable media of claim 1, wherein:
   the inbound data comprises information technology (IT) data that describes one or more static characteristics of a device, person, or space; and
   wherein the program instructions cause the one or more processors to transform the one or more static characteristics of the device, person, or space into one or more static attributes of the plurality of digital twins.

8. The one or more non-transitory computer readable media of claim 1, wherein the inbound data describes the plurality of digital twin and relationships therebetween.

9. The one or more non-transitory computer readable media of claim 1, wherein:
   the inbound data comprises operational technology (OT) data that describes one or more dynamic states or conditions of a device, person, or space; and
   the program instructions cause the one or more processors to transform the one or more dynamic states or conditions of the device, person, or space into one or more dynamic attributes of the plurality of digital twins.

10. The one or more non-transitory computer readable media of claim 1, wherein the plurality of digital twins comprise:
    one or more object entities each representing a physical device;
    one or more data entities each representing data generated by a corresponding physical device, each of the one or more data entities comprising a static attribute identifying a corresponding object entity and a dynamic attribute storing a most recent value of a dynamic variable associated with the corresponding physical device; and
    one or more relational objects indicating relationships interconnecting the one or more object entities and the one or more data entities, each of the one or more relational objects comprising a first attribute identifying a particular object entity and a second attribute identifying a corresponding data entity.

11. A method for managing data relating to a plurality of physical devices connected to one or more electronic communications networks, comprising:
    creating and managing a plurality of smart entities representing at least one of devices, people, or spaces, the plurality of smart entities associated with at least one of a plurality of attributes via a plurality of relationships, one relationship of the plurality of relationships relating one smart entity of the plurality of smart entities to one attribute of the plurality of attributes;
    receiving inbound data from one or more enterprise applications;
    translating the inbound data into a plurality of values for one or more of the plurality of attributes;
    writing the plurality of values to the plurality of attributes;
    reading the plurality of attributes of the plurality of smart entities;
    translating the plurality of attributes into outbound data; and providing the outbound data to the one or more enterprise applications.

12. The method of claim 11, wherein the one or more enterprise applications comprise at least one of a workflow automation system, a customer relationship management system, a global information system, a device management system, a human resources system, an accounting system, a marketing system, or a building management system.

13. The method of claim 11, wherein the one or more enterprise applications comprise a workflow automation system and the inbound data comprises a workflow request;
the method further comprising creating a workflow request entity representing the workflow request and generate a plurality of workflow attributes of the workflow request entity using information contained in the workflow request.

14. The method of claim 11, wherein the plurality of smart entities are virtual representations of a physical system or device, person or group of people, or space or group of spaces.

15. The method of claim 11, wherein:
the inbound data comprises information technology (IT) data that describes one or more static characteristics of a device, person, or space; and
the method further comprising transforming the one or more static characteristics of the device, person, or space into one or more static attributes of the plurality of smart entities.

16. The method of claim 11, wherein the inbound data describes the plurality of smart entities and relationships therebetween.

17. The method of claim 11, wherein:
the inbound data comprises operational technology (OT) data that describes one or more dynamic states or conditions of a device, person, or space; and
the method further comprising transforming the one or more dynamic states or conditions of the device, person, or space into one or more dynamic attributes of the plurality of smart entities.

18. The method of claim 11, wherein the plurality of smart entities comprise:
one or more object entities each representing a physical device;
one or more data entities each representing data generated by a corresponding physical device, each of the one or more data entities comprising a static attribute identifying a corresponding object entity and a dynamic attribute storing a most recent value of a dynamic variable associated with the corresponding physical device; and
one or more relational objects indicating relationships interconnecting the one or more object entities and the one or more data entities, each of the one or more relational objects comprising a first attribute identifying a particular object entity and a second attribute identifying a corresponding data entity.

19. A web services platform comprising:
an entity service including one or more processing circuits configured to create and manage a plurality of smart entities representing at least one of devices, people, or spaces, the plurality of smart entities associated with at least one of a plurality of attributes via a plurality of relationships, one relationship of the plurality of relationships relating one smart entity of the plurality of smart entities to one attribute of the plurality of attributes; and
a software defined gateway including one or more processing circuits configured to:
receive inbound data from one or more enterprise applications, translate the inbound data into values for one or more of the plurality of attributes, and write the values to the plurality of attributes; and
read the plurality of attributes of the plurality of smart entities, translate the plurality of attributes into outbound data, and provide the outbound data to the one or more enterprise applications.

20. The web services platform of claim 19, wherein the plurality of smart entities comprise:
one or more object entities each representing a physical device;
one or more data entities each representing data generated by a corresponding physical device, each of the one or more data entities comprising a static attribute identifying a corresponding object entity and a dynamic attribute storing a most recent value of a dynamic variable associated with the corresponding physical device; and
one or more relational objects indicating relationships interconnecting the one or more object entities and the one or more data entities, each of the one or more relational objects comprising a first attribute identifying a particular object entity and a second attribute identifying a corresponding data entity.

\* \* \* \* \*